(12) United States Patent
Bohn et al.

(10) Patent No.: US 11,531,202 B2
(45) Date of Patent: Dec. 20, 2022

(54) WAVEGUIDE ASSEMBLY WITH VIRTUAL IMAGE FOCUS

(71) Applicant: Microsoft Technology Licensing, LLC, Redmond, WA (US)

(72) Inventors: David Bohn, Fort Collins, CO (US); Tuomas Vallius, Kirkland, WA (US); Jani Kari Tapio Tervo, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 17/089,783

(22) Filed: Nov. 5, 2020

(65) Prior Publication Data

US 2022/0137408 A1 May 5, 2022

(51) Int. Cl.
*G02B 27/01* (2006.01)
(52) U.S. Cl.
CPC .... *G02B 27/0172* (2013.01); *G02B 2027/013* (2013.01); *G02B 2027/0174* (2013.01)
(58) Field of Classification Search
CPC .............. G02B 27/017; G02B 27/0172; G02B 2027/013; G02B 2027/0174
See application file for complete search history.

(56) References Cited

U.S. PATENT DOCUMENTS

2010/0079356 A1* 4/2010 Hoellwarth ......... H04M 1/0266
345/8
2019/0179149 A1* 6/2019 Curtis .................... G02B 5/201
2019/0187474 A1* 6/2019 Bhargava ........... G02B 27/0955
2020/0049999 A1 2/2020 Takeda et al.
2020/0200964 A1 6/2020 Adema

FOREIGN PATENT DOCUMENTS

CN 111886533 A 11/2020

OTHER PUBLICATIONS

"International Search Report and Written Opinion Issued in PCT Application No. PCT/US21/053063", dated Jan. 20, 2022, 11 Pages.

* cited by examiner

*Primary Examiner* — Alexander Eisen
*Assistant Examiner* — Cory A Almeida
(74) *Attorney, Agent, or Firm* — Mark K. Young; Mayer & Williams, PC

(57) ABSTRACT

An optical combiner, configured for use in a mixed-reality display system that combines holographic and real-world images, includes an assembly of see-through waveguides that are arranged in a stack to provide full color holographic images from constituent RGB (red, green, and blue) color components received from a holographic image source. Each waveguide—one per RGB color component—includes an in-coupling DOE (diffractive optical element), an intermediate DOE, and an out-coupling DOE that are disposed on internal surfaces of the stacked waveguides in the optical combiner. Each of the out-coupling DOEs incorporates a diffractive lens functionality to render the out-coupled holographic images at a set depth on the mixed-reality display. In an illustrative non-limiting example, the out-coupling DOE may provide a half diopter of negative lens power to set the optical focus of the holographic images at 1.33 m.

20 Claims, 25 Drawing Sheets

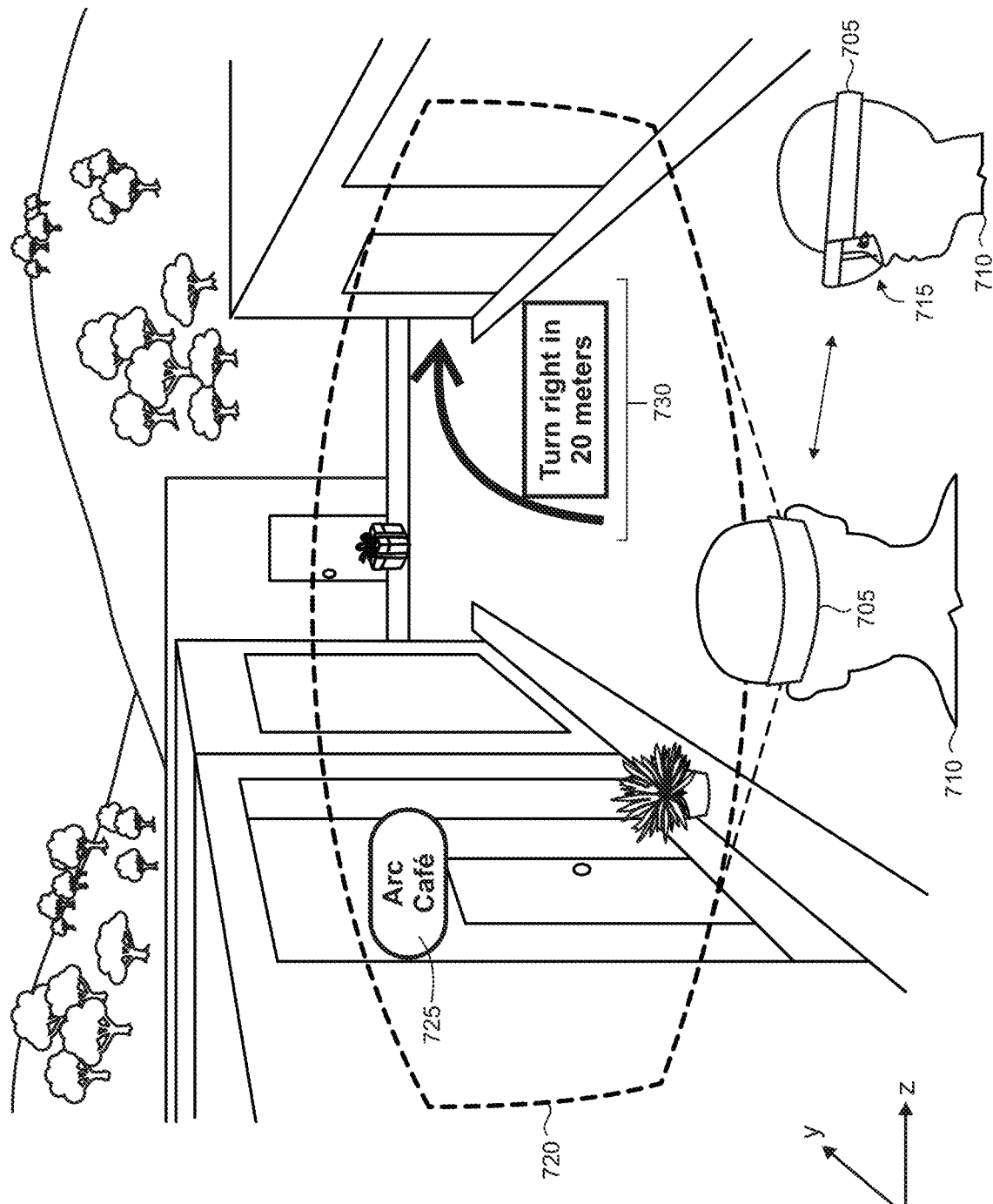

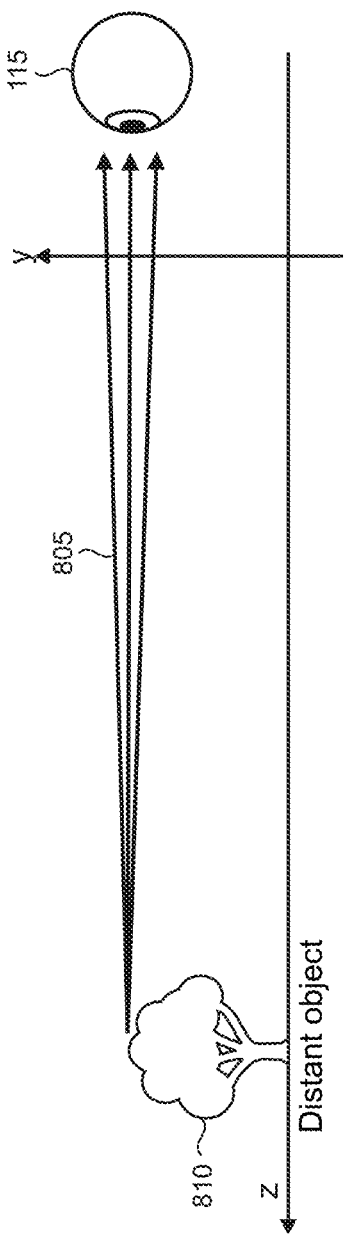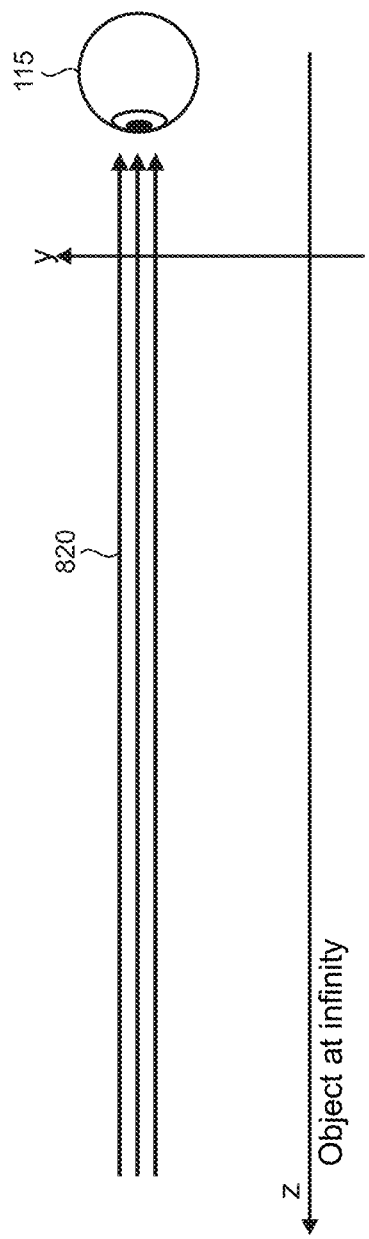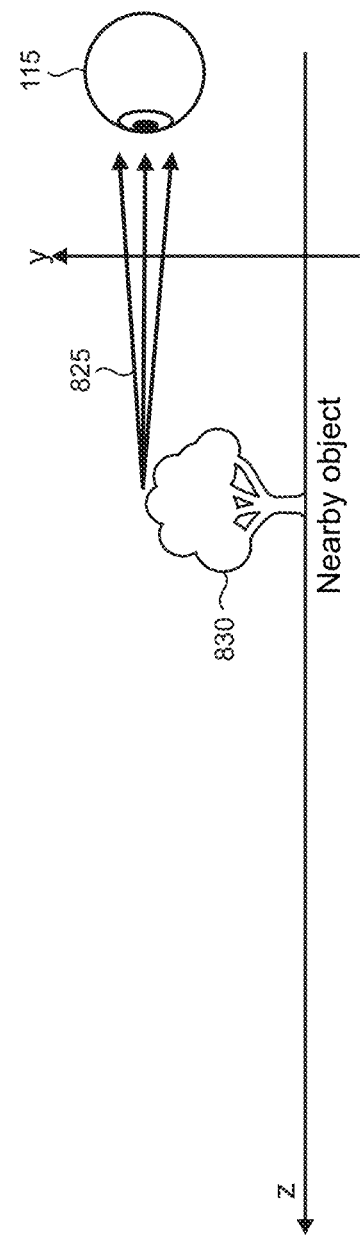
FIG. 8A
FIG. 8B
FIG. 8C

1500

1600

$D_o = 2\pi/d_o,$
$d_{ox} = d_o \sec \phi_o,$
$d_{oy} = d_o \csc \phi_o,$
$D_{ox} = D_o \cos \phi_o,$
$\quad = 2\pi/d_{ox},$
$D_{oy} = D_o \sin \phi_o,$
$\quad = 2\pi/d_{oy}$

1800

1700

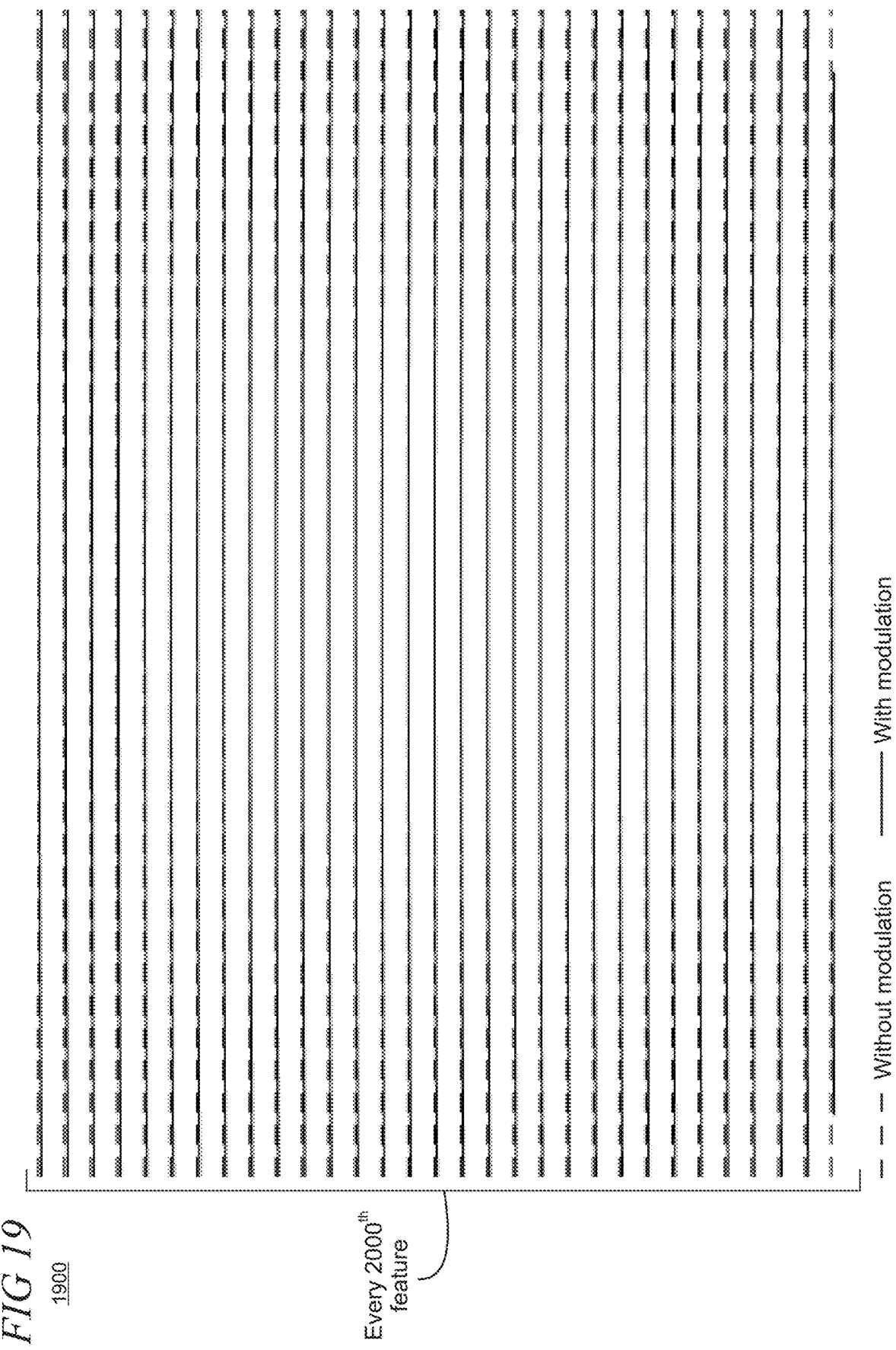

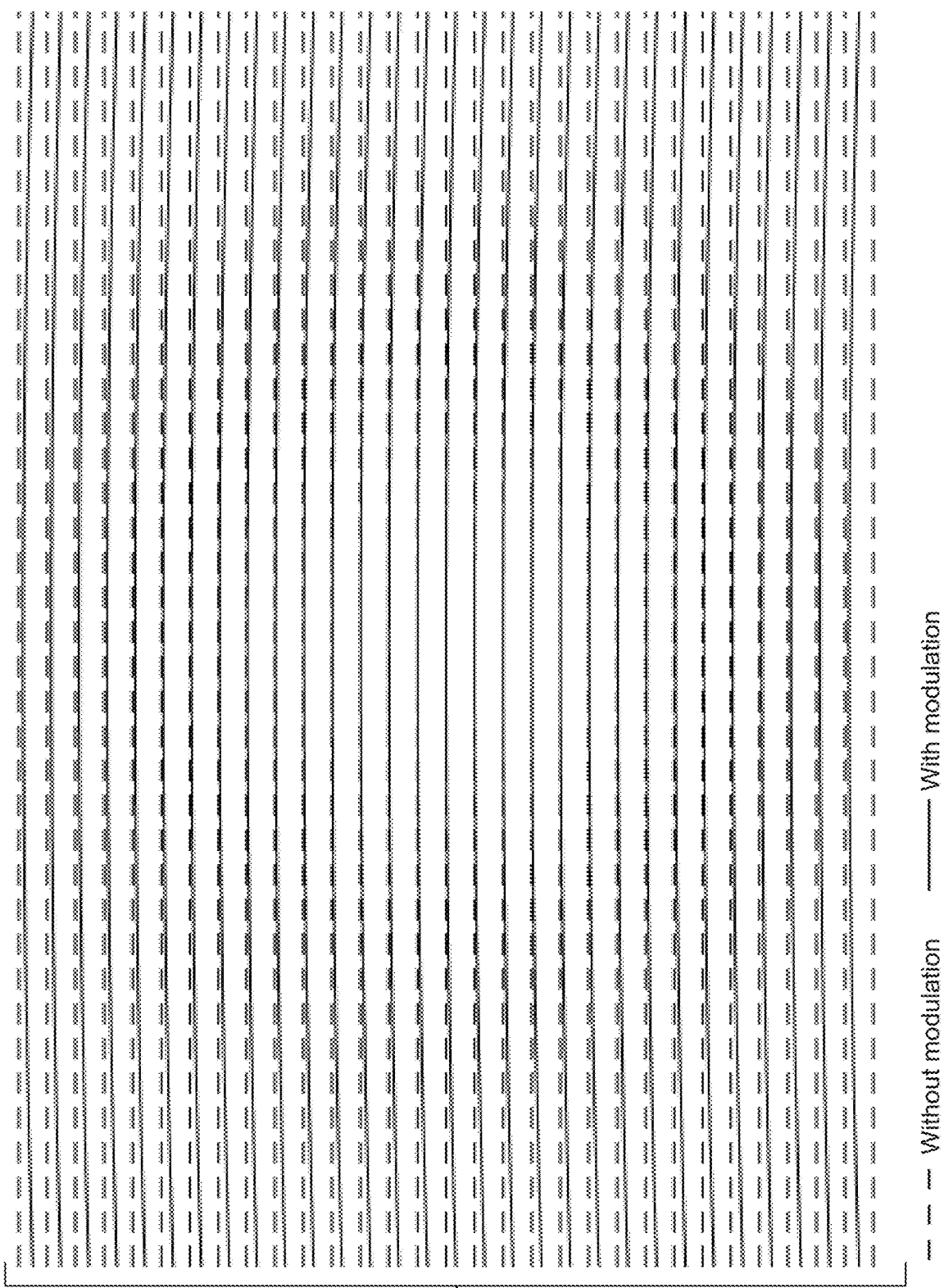

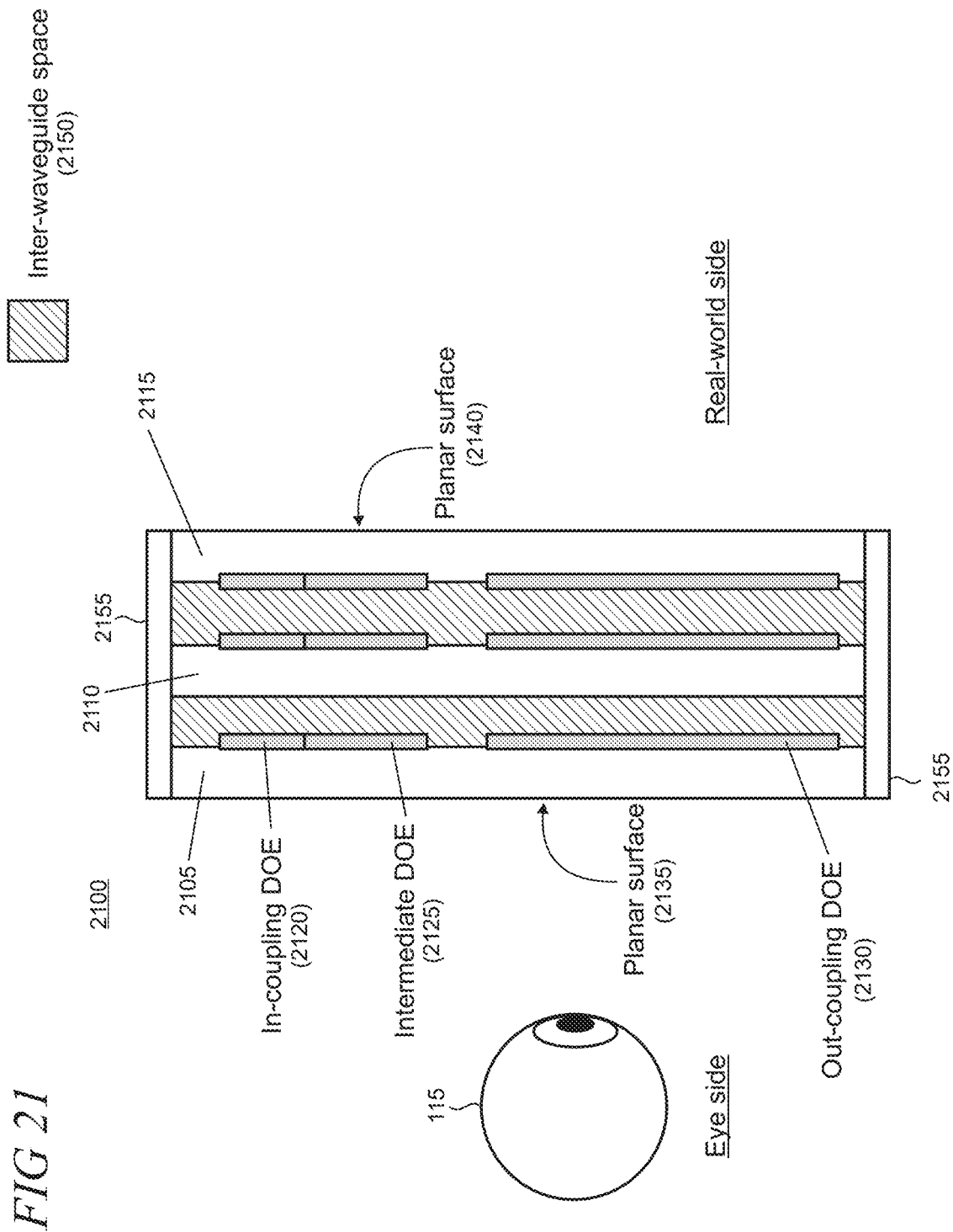

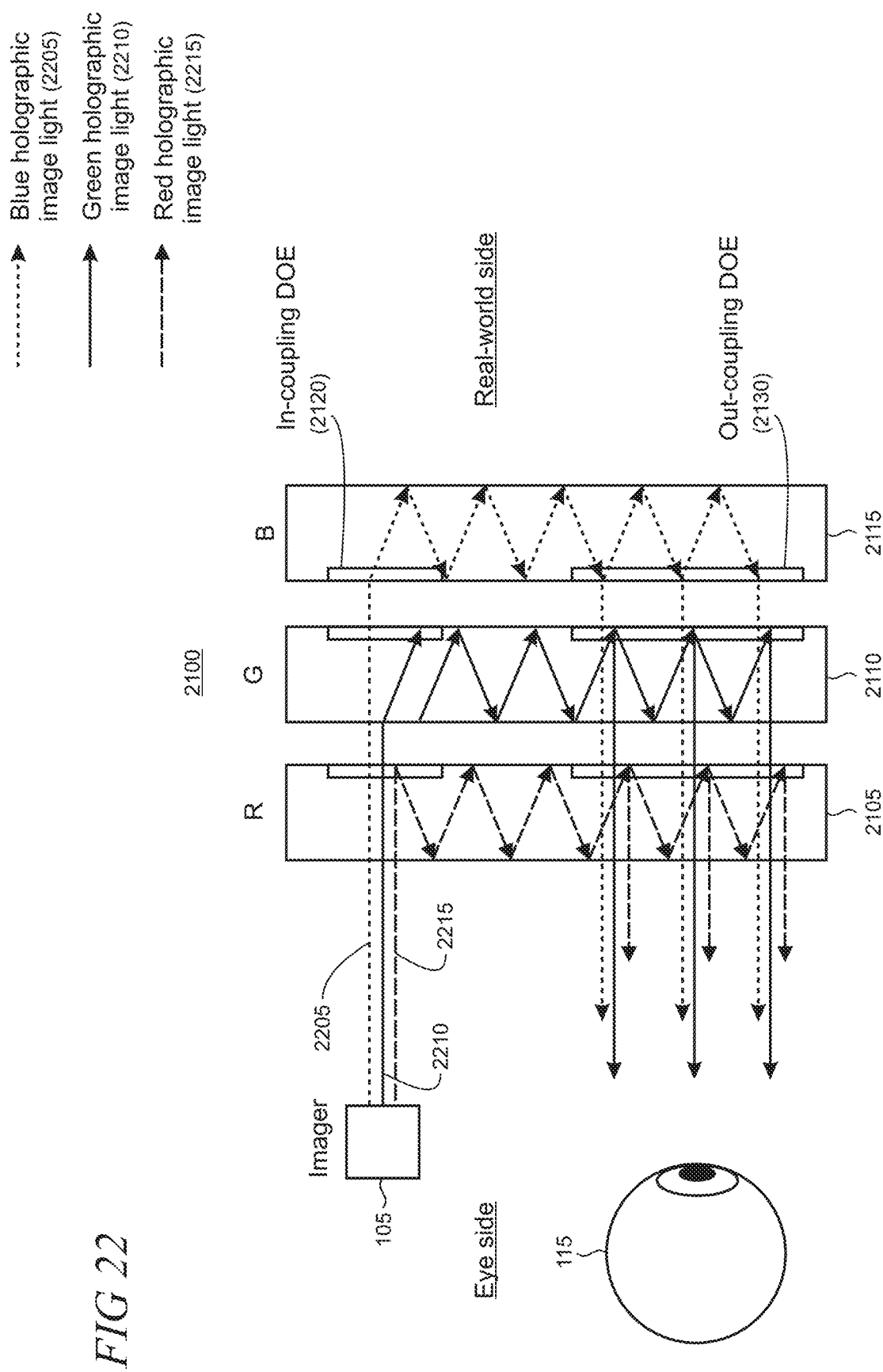

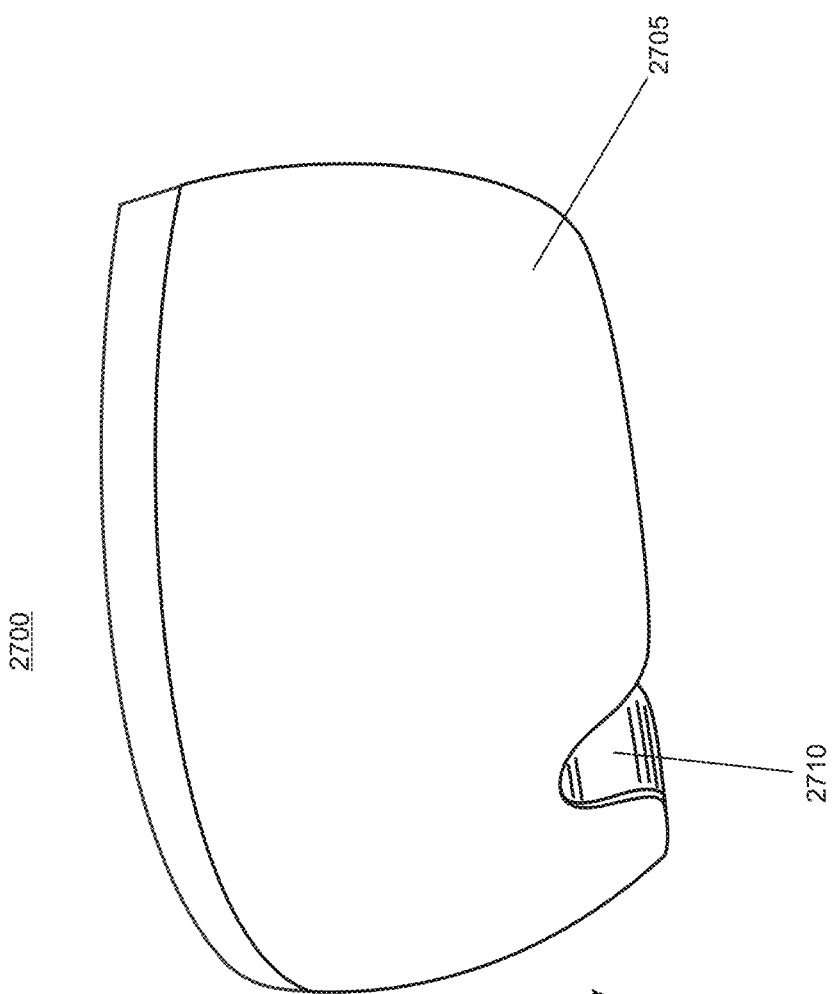
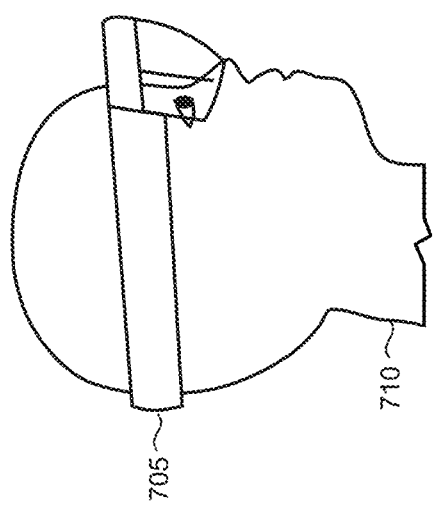
FIG 27

WAVEGUIDE ASSEMBLY WITH VIRTUAL IMAGE FOCUS

BACKGROUND

Mixed-reality computing devices, such as head-mounted display (HMD) systems and handheld mobile devices (e.g. smart phones, tablet computers, etc.), may be configured to display information to a user about virtual objects, such as holographic images, and/or real objects in a field of view of the user and/or a field of view of a camera of the device. For example, an HMD device may be configured to display, using a see-through display system, virtual environments with real-world objects mixed in, or real-world environments with virtual objects mixed in. Similarly, a mobile device may display such information using a camera viewfinder window.

SUMMARY

An optical combiner, configured for use in a mixed-reality display system that combines holographic and real-world images, includes an assembly of see-through waveguides that are arranged in a stack to provide full color holographic images from constituent RGB (red, green, and blue) color components received from a holographic image source. Each waveguide—one per RGB color component—includes an in-coupling DOE (diffractive optical element), an intermediate DOE, and an out-coupling DOE that are disposed on internal surfaces of the stacked waveguides in the optical combiner. The in-coupling DOEs in-couple collimated holographic image light as RGB color component inputs to the respective waveguides. The intermediate DOEs expand the exit pupil of the image light in a first direction and the out-coupling DOEs provide pupil expansion in a second direction relative to the input while out-coupling the holographic images to a system user's eye. Each of the out-coupling DOEs incorporates a diffractive lens functionality to render the out-coupled holographic images at a set depth on the mixed-reality display. In an illustrative non-limiting example, the out-coupling DOE may provide a half diopter of negative lens power to set the optical focus of the holographic images at 1.33 m.

The out-coupling DOEs on the waveguides are each configured with locally-modulated grating feature periods to transform the planar wavefront of the collimated holographic images provided as an the input of the optical combiner to a spherical wavefront with a radius of curvature that matches the set depth of optical focus. The local modulation of grating period is implemented using curved grating lines in which the period changes across the out-coupling DOE are kept small relative to an unmodulated configuration. Such approach advantageously minimizes the effects of spectral dispersion to reduce distortion of the displayed holographic images and the real-world images that are seen through the out-coupling DOE.

Some waveguide-based mixed-reality display systems known in the optical arts employ a set of lenses that provide for virtual image focus at a set distance using a negative lens on the eye side of an optical combiner and its conjugate positive lens on the real-world side. The lenses may be incorporated into protective elements, such as a visor, that externally encase the combiner to protect the optical elements during system use and handling. By locating the DOEs on the internal surface of stacked waveguides in the optical combiner of the present waveguide assembly and configuring the out-coupling DOE as a diffractive negative lens, such lenses and external protective elements can be eliminated from the display system design which may reduce parts count, cost, size, and weight. Such reductions can be particularly advantageous, for example, when the mixed-reality display system is used in head-mounted display (HMD) display applications and in consumer markets where cost sensitivity may be heightened. In addition, optical performance of the mixed-reality display system may be enhanced by the elimination of the lenses and protective elements by increasing see-through transmission, uniformity, and contrast and by reducing ghost images, reflections, and other aberrations caused by the lenses and/or protective elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 7 illustratively shows holographic images from a virtual world that are overlaid onto real-world images within a field of view (FOV) of a mixed-reality head-mounted display (HMD) device;

FIGS. 8A, 8B, and 8C show illustrative paths of light rays that are respectively associated with a distant object, an object at infinity, and a nearby object;

FIG. 19 is an enlarged plan view of an illustrative out-coupling DOE that shows the period of every $2000^{th}$ grating feature being modulated to provide for virtual image focus at 1.33 m;

FIG. 20 is an enlarged plan view of an illustrative out-coupling DOE that shows the period of every $2000^{th}$ grating feature being modulated to provide for virtual image focus at 0.5 m;

FIG. 21 shows a side view of an illustrative assembly of three waveguides with integrated DOEs that are stacked to form an optical combiner, in which each waveguide handles a different color in an RGB (red, green, blue) color model, and in which the DOEs are disposed on internal surfaces of the waveguides in the optical combiner;

FIG. 22 shows illustrative propagation of holographic image light through an optical combiner;

FIG. 27 shows a pictorial front view of an illustrative sealed visor that may be used as a component of an HMD device;

Like reference numerals indicate like elements in the drawings. Elements are not drawn to scale unless otherwise indicated.

DETAILED DESCRIPTION

Figure 1:
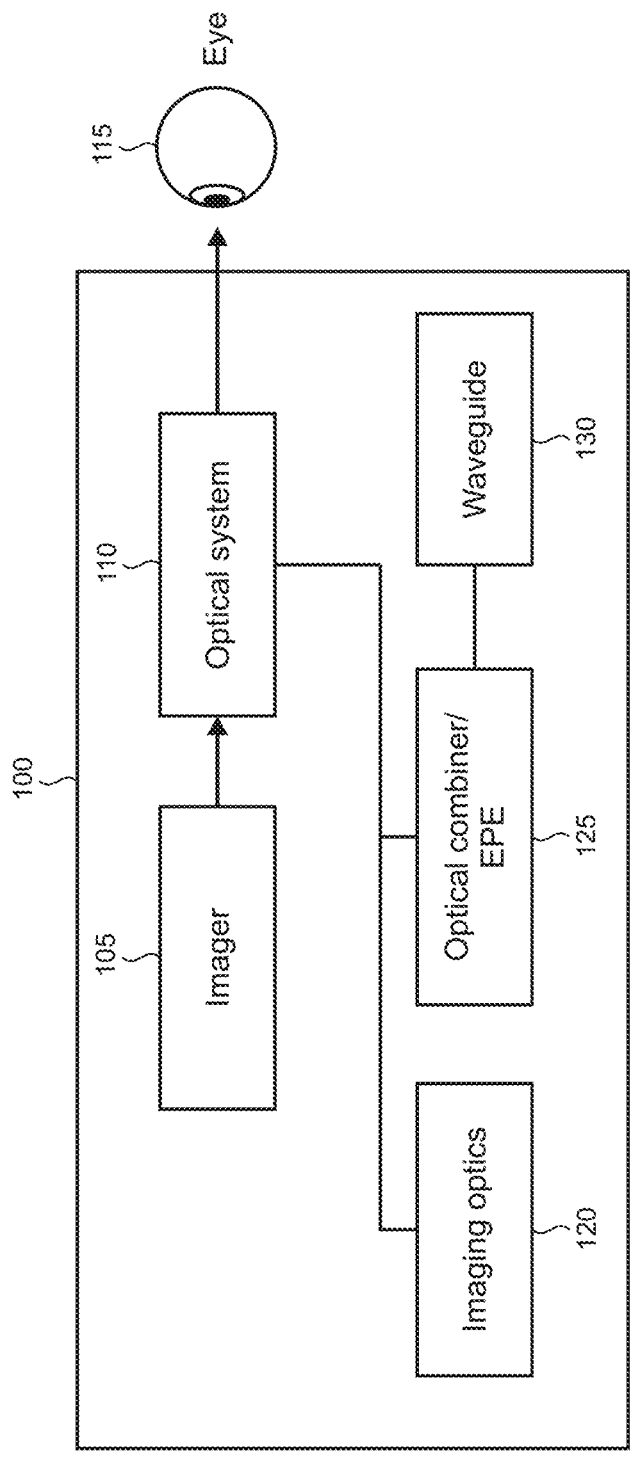
FIG. 1 shows a block diagram of an illustrative near-eye display system.

FIG. 1 shows a block diagram of an illustrative near-eye display system 100 which may incorporate an imager 105 and an optical system 110. The optical system 110 may also include imaging optics 120 (e.g., magnifying and/or collimating lenses), and an optical combiner 125 that provides exit pupil expander (EPE) functionality that may be implemented using at least one waveguide 130.

Multiple diffractive optical elements (DOEs, also synonymously referred to as diffraction gratings) are disposed on the waveguide 130 and configured to provide in-coupling of incident light into the waveguide, exit pupil expansion in two directions, and out-coupling of light out of the waveguide to an eye 115 of a system user. Near-eye display systems are often used, for example, in head-mounted display (HMD) devices in industrial, commercial, and consumer applications. Other devices and systems may also use near-eye display systems, as described below. The near-eye display system 100 is an example that is used to provide context and illustrate various features and aspects of the present waveguide assembly with virtual focus.

The imager 105 in system 100 may include one or more sources of holographic images (e.g., images representing objects from a virtual world that are not necessarily stereo images) that interoperate with the optical system 110 to deliver virtual images as a virtual display to a user's eye 115 (it is noted that the terms holographic image, virtual image, and virtual object are utilized as synonyms unless statements or context indicate otherwise). The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager may also include electronics such as processors, optical components such as mirrors and/or lenses, and/or mechanical and other components that enable a virtual display to be composed and provide one or more input optical beams to the optical system.

In a near-eye display system the imager does not actually shine the images on a surface such as a glass lens to create the visual display for the user. This is not feasible because the human eye cannot focus on something that is that close. Rather than create a visible image on a surface, the near-eye display system 100 uses the optical system to form a pupil and the eye 115 acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the holographic image light after leaving the display system. The exit pupil defines the eyebox which comprises a spatial range of eye positions of the user in which the holographic images projected by the display system are visible.

The waveguide 130 facilitates light transmission between the imager and the eye. One or more waveguides can be utilized in the near-eye display system because they are transparent and because they are generally small and light-weight (which is desirable in applications such as HMD devices where size and weight are generally sought to be minimized for reasons of performance and user comfort). For example, the waveguide 130 can enable the imager 105 to be located out of the way, for example, on the side of the user's head or near the forehead, leaving only a relatively small, light, and transparent waveguide optical element in front of the eyes.

Figure 2:
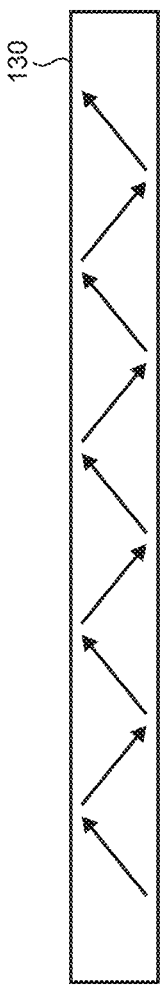
FIG. 2 shows propagation of light in a waveguide by total internal reflection (TIR)

In an illustrative implementation, the waveguide 130 operates using a principle of total internal reflection (TIR), as shown in FIG. 2, so that light can be coupled among the various optical elements in the system 100. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

Figure 3:
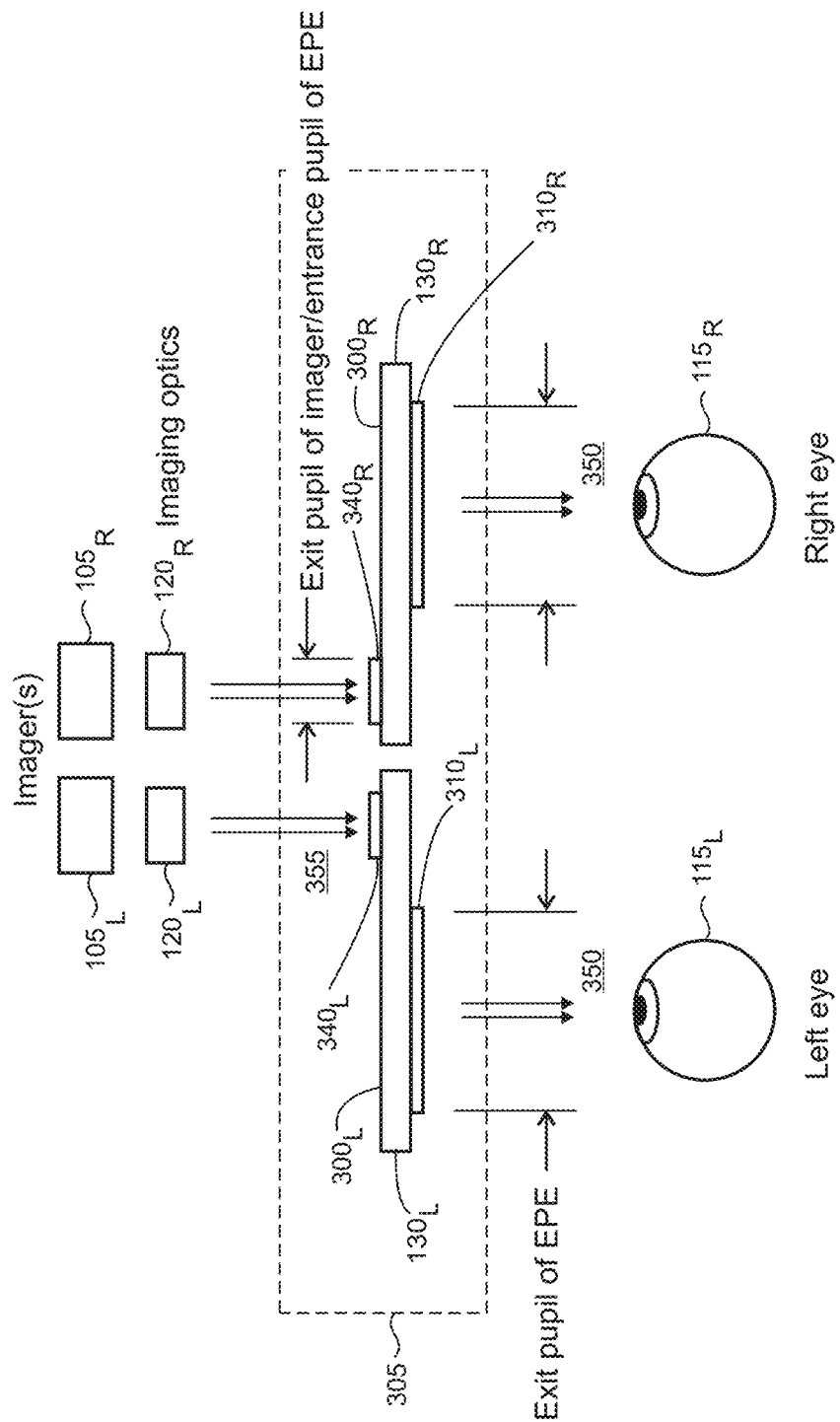
FIG. 3 shows a view of an illustrative exit pupil expander.

FIG. 3 shows a view of an illustrative EPE 305 that uses separate left and right displays ($300_L$ and $300_R$), each with its own imager ($105_L$ and $105_R$) and imaging optics ($120_L$ and $120_R$). The illustrative EPE is provided as an element of an optical combiner, as discussed below in the text accompanying FIG. 21. Each display in the EPE receives one or more input optical beams from an imager 105 as an entrance pupil for holographic image light to produce one or more output optical beams with expanded exit pupil in one or two directions relative to the input. The expanded exit pupil typically facilitates a virtual display to be sufficiently sized to meet the various design requirements, such as eyebox size, image resolution, field of view (FOV), and the like, of a given optical system while enabling the imager and associated components to be relatively light and compact.

The EPE 305 is configured, in this illustrative example, to provide binocular operation for both the left and right eyes which may support binocular or stereoscopic viewing. Some components that may be utilized for binocular or stereoscopic operation such as scanning mirrors, lenses, filters, beam splitters, MEMS (micro-electromechanical system) devices, or the like are not shown in FIG. 3 for sake of clarity in exposition. The EPE 305 utilizes two out-coupling DOEs, $310_L$ and $310_R$ that are supported on the waveguides $130_L$ and $130_R$ and two in-coupling DOEs $340_L$ and $340_R$.

The in-coupling and out-coupling DOEs may be configured using multiple DOEs and may further include one or more intermediate DOEs (not shown) as described below. The DOEs may be arranged in various configurations on the waveguide, for example, on the same side or different sides and may further be single- or double-sided. While the EPE 305 is depicted as having a planar configuration, other shapes may also be utilized including, for example, curved or partially spherical shapes, in which case gratings in the DOEs disposed thereon may be non-co-planar.

Figure 4:
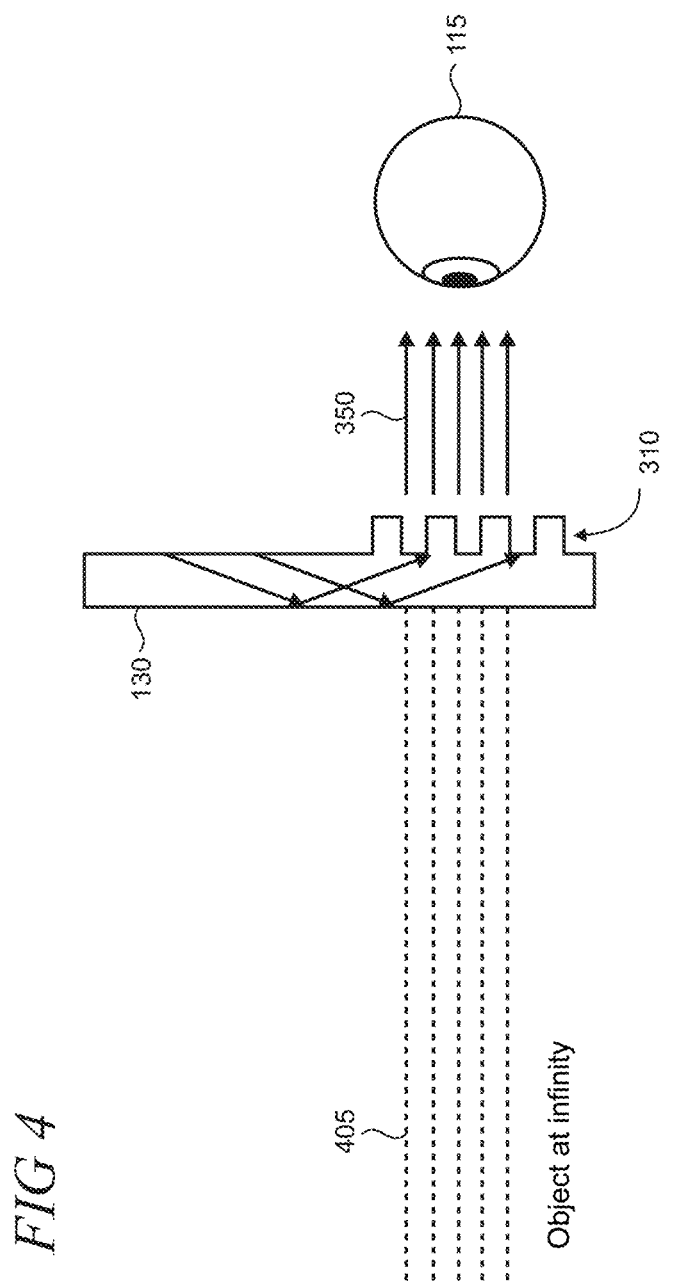
FIG. 4 shows illustrative collimated light output from a diffractive optical element (DOE) in an exit pupil expander.

As shown in FIG. 3, exemplary output beams 350 from the EPE 305 are parallel to the exemplary input beams 355 that are output from the imager 105 to the in-coupling DOE 340. In some implementations, the input beams are collimated such that the output beams are also collimated, as indicated by the parallel lines in the drawing. Typically, in waveguide-based combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread. As discussed in more detail below, the collimated inputs and outputs in conventional waveguide-based display systems provide holographic images displayed by the optical system 110 that are focused at infinity, as indicated by reference numeral 405 in FIG. 4.

Figure 5:
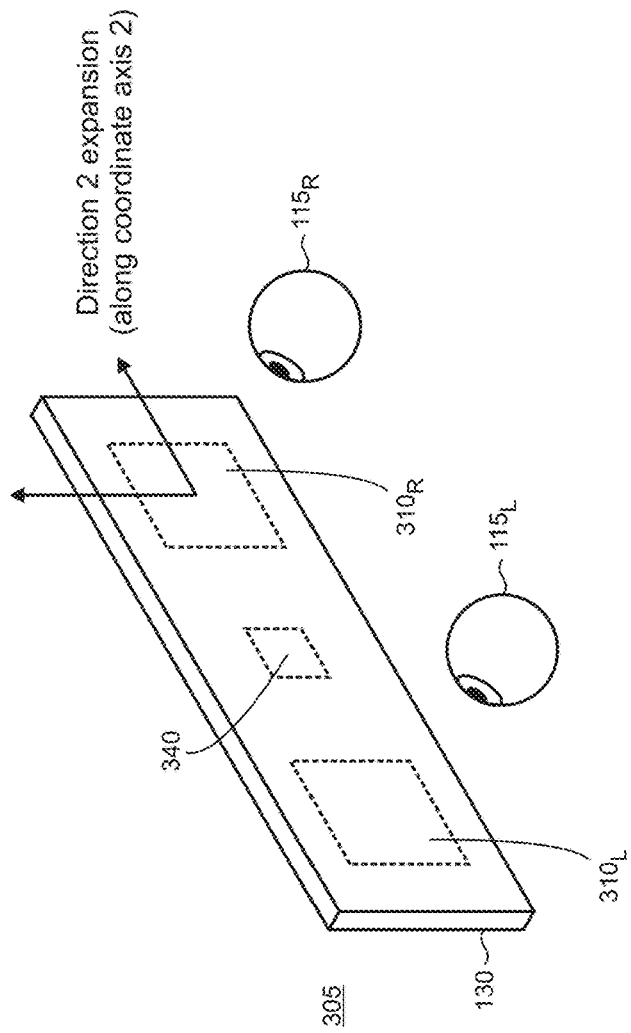
FIG. 5 shows a view of an illustrative exit pupil expander in which the exit pupil is expanded along two directions of the field of view (FOV)

As shown in FIG. 5, the EPE 305 may be configured to provide an expanded exit pupil in two directions (i.e., along each of a first and second coordinate axis). As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye display device is upright and forward facing, but less intuitive for other usage scenarios. The listed terms are not to be construed to limit the scope of the configurations (and usage scenarios therein) of near-eye display features utilized in the present arrangement.

Figure 6:
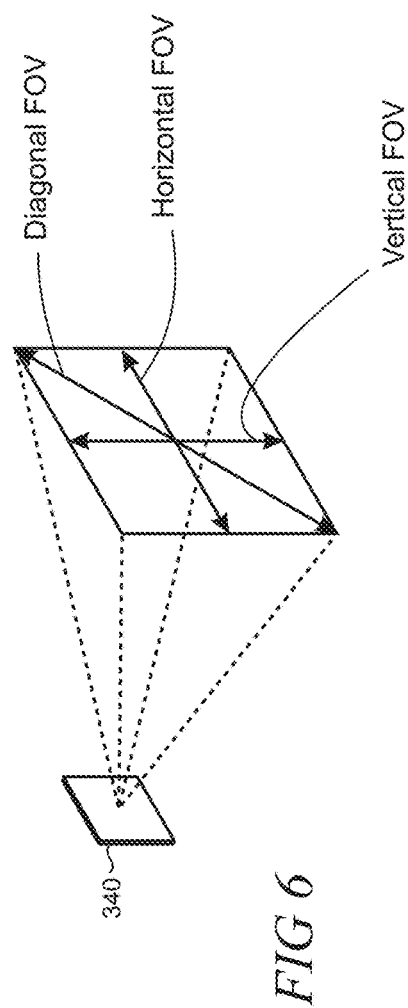
FIG. 6 shows an illustrative input to an exit pupil expander in which the FOV is described by angles in horizontal, vertical, or diagonal orientations.

The entrance pupil to the EPE 305 at the in-coupling DOE 340 is generally described in terms of field of view (FOV), for example, using horizontal FOV, vertical FOV, or diagonal FOV as shown in FIG. 6. The FOV is typically a parameter of interest that can vary by application. For example, an HMD device for one application may be designed with a diagonal FOV of 34 degrees for holographic images while another may have a 52-degree FOV. Some non-planar waveguide-based HMD devices have been proposed with FOVs of more than 70 degrees. It is noted that FOV is just one of many parameters that are typically considered and balanced by HMD designers to meet the requirements of a particular implementation. For example, such parameters may include eyebox size, brightness, transparency and duty time, contrast, resolution, color fidelity, depth perception, size, weight, form-factor, and user comfort (i.e., wearable, visual, and social), among others.

FIG. 7 shows an illustrative mixed-reality HMD device 705 worn by a user 710 having a see-through waveguide display 715 that incorporates the near-eye display system 100 (FIG. 1), among various other components and may be further adapted to provide virtual image focus in accordance with the principles discussed herein. As noted above, an imager (not shown) generates holographic images that are guided by the waveguide display to the user. Being see-through, the waveguide display enables the user to perceive light from the real world.

The see-through waveguide display 715 can render holographic images of various virtual objects that are superimposed over the real-world images that are collectively viewed using the see-through waveguide display to thereby create a mixed-reality environment 700 within the HMD device's FOV 720. It is noted that the FOV of the real world and the FOV of the holographic images from the virtual world are not necessarily identical, as the FOV of the near-eye display system 100 is typically a subset of that associated with the real-world FOV.

In this illustrative example, the user 710 is physically walking in a real-world urban area that includes city streets with various buildings, stores, etc., with a countryside in the distance. The FOV of the cityscape viewed on HMD device 705 changes as the user moves through the real-world environment and the device can render static and/or dynamic virtual images over the real-world view. In this illustrative example, the holographic images include a tag 725 that identifies a restaurant business and directions 730 to a place of interest in the city. The mixed-reality environment 700 seen visually on the waveguide display may also be supplemented by audio and/or tactile/haptic sensations produced by the HMD device in some implementations.

During natural viewing, the human visual system relies on multiple sources of information, or "cues," to interpret three-dimensional shapes and the relative positions of objects. Some cues rely only on a single eye (monocular cues), including linear perspective, familiar size, occlusion, depth-of-field blur, and accommodation. Other cues rely on both eyes (binocular cues), and include vergence (essentially the relative rotations of the eyes required to look at an object) and binocular disparity (the pattern of differences between the projections of the scene on the back of the two eyes).

To view objects clearly, humans must accommodate, or adjust their eyes' focus, to the distance of the object. At the same time, the rotation of both eyes must converge to the object's distance to avoid seeing double images. In natural viewing, vergence and accommodation are linked. When viewing something near (e.g. a housefly close to the nose) the eyes cross and accommodate to a near point. Conversely, when viewing something at optical infinity, the eyes' lines of sight become parallel and the eyes' lenses accommodate to infinity.

In typical HMD devices, users will always accommodate to the focal distance of the display (to get a sharp image) but converge to the distance of the object of interest (to get a single image). When users accommodate and converge to different distances, the natural link between the two cues must be broken and this can lead to visual discomfort or fatigue. Accordingly, to maximize the quality of the user experience and comfort with the HMD device 705 (FIG. 7), holographic images may be rendered in a plane to appear at a constant distance from the user's eyes. For example, holographic images, including the images 725 and 730, can be set at a fixed depth of 1.33 m from the user 710. Thus, the user 710 will always accommodate near 1.33 m to maintain a clear image in the HMD device. It may be appreciated that 1.33 m is an illustrative distance and is intended to be non-limiting. Other distances may be utilized to meet requirements of specific applications. For example, 2 m has been specified as a fixed depth for holographic images in some mixed-reality HMD device applications with satisfactory results.

In the real world as shown in FIG. 8A, light rays 805 from distant objects 810 reaching an eye 115 of a user are almost parallel. Real-world objects at optical infinity (roughly around 6 m and farther for normal vision) have light rays 820 that are exactly parallel when reaching the eye, as shown in FIG. 8B. Light rays 825 from a nearby real-world object 830 reach the eye with different, more divergent angles, as shown in FIG. 8C, compared to those for more distant objects.

Various approaches may be utilized to render holographic images with the suitable divergent angles to thereby appear at the targeted depth of focus. To illustrate the principles of the present waveguide display with virtual image focus, a brief discussion of one particular illustrative known technique is now provided.

Figure 9:
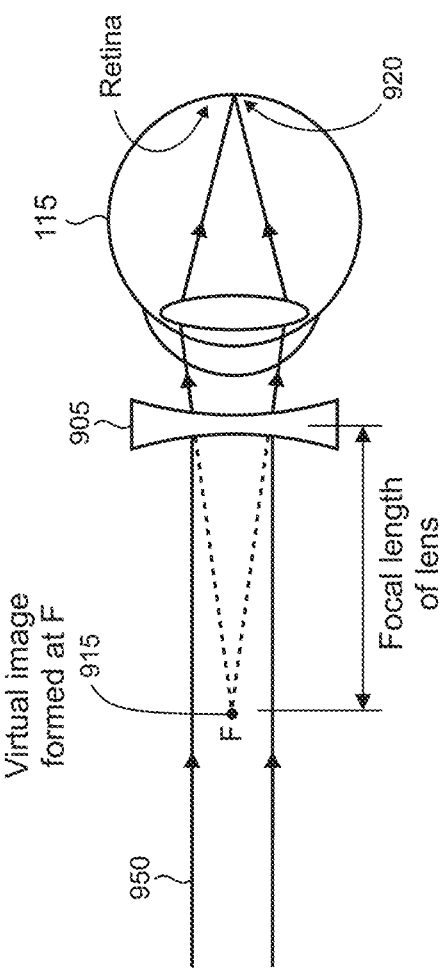
FIG. 9 shows an illustrative negative lens that provides for a virtual image that is located at a focal point of the lens.

FIG. 9 shows that a concave lens 905 can diverge the collimated/parallel rays 950 (e.g., beams 350 shown in FIG. 3) that are received from a conventional out-coupling DOE (not shown) to produce an optical virtual image having a location that is apparent to the user at a focal point, F (as indicated by reference numeral 915), that is determined by the focal length of the lens (e.g., 0.5 m, 1.33 m, 2 m, etc.). The rays from the concave lens arriving at the user's eye 115 are non-parallel and divergent, as shown, and converge using the eye's internal lens to form the image on the retina, as indicated by reference numeral 920.

Figure 10:
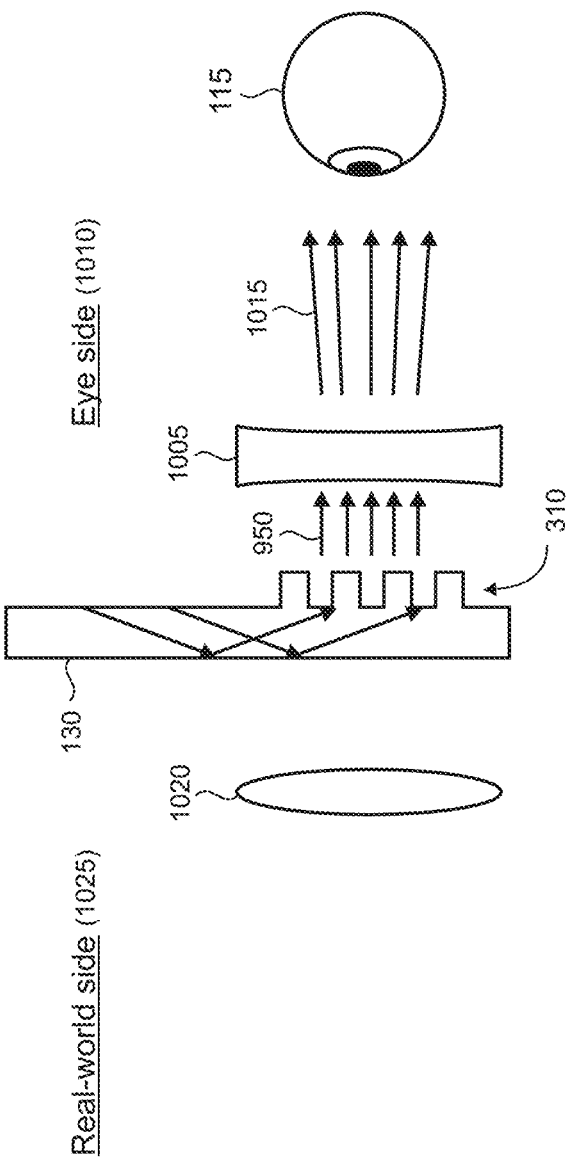
FIG. 10 shows a combination of a positive and negative lens that are located on either side of a waveguide and out-coupling DOE.

A pair of lenses may be utilized to provide virtual image focus at a set depth with a conventional waveguide display, as shown in FIG. 10 (for clarity in exposition, the holographic image source and other optical components used to handle the images in the waveguide 130 are not shown). With this illustrative approach, a negative (i.e., concave) lens 1005 is located on the eye side (indicated by reference numeral 1010) of the waveguide 130. The negative lens acts over the entire extent of the eyebox associated with the user's eye 115 to thereby create the diverging rays 1015 from the collimated rays 950 that exit the out-coupling DOE 310. To ensure that the user's view of the real world remains unperturbed by the negative lens, a conjugate positive (i.e., convex) lens 1020 is located on the real-world side (indicated by reference numeral 1025) of the waveguide to compensate for the impact of the negative lens on the real-world view.

Figure 11:
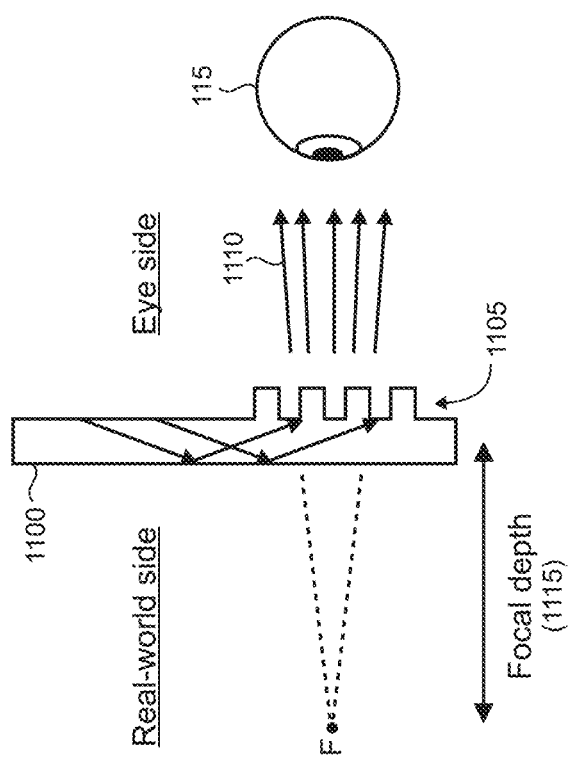
FIG. 11 shows an illustrative waveguide and out-coupling DOE arranged to output non-collimated diverging optical beams to provide virtual image focus.

While the lenses 1005 and 1020 can perform satisfactorily to implement virtual image focus at a set depth in many applications, it may be advantageous in other applications to implement and utilize an alternative virtual image focus approach. FIG. 11 shows an illustrative waveguide 1100 on which an out-coupling DOE 1105 is disposed. The out-coupling DOE is specifically adapted to output non-collimated diverging optical beams 1110 to the user's eye 115 to thereby present holographic images at a predetermined focal depth range without the use of external lenses. In addition to providing virtual image focus, the out-coupling DOE 1105 is also configured to incorporate an exit pupil expansion functionality, as discussed above.

The out-coupling DOE 1105 incorporates negative lens functionality, for example, having −0.5 diopters of optical power to provide for a focal plane for the rendered holographic images located at 2 m in front of the user. Different amounts of optical power may be utilized to provide for focal planes that are located at other distances to suit requirements of a particular application. The lens power of the out-coupling DOE does not affect the zeroth diffraction order that travels in TIR down the waveguide 1100 (i.e., from top to bottom in the drawings), but instead only the diffracted out-coupled field. In addition, the see-through field is not affected by the negative lensed out-coupling DOE because whatever portion of the see-through field that is diffracted by the out-coupling DOE is trapped by TIR in the waveguide and is therefore not transmitted to the user's eye 115. Thus, by introducing the negative optical power to the out-coupling DOE, neither of the lenses 1005 and 1020 shown in FIG. 10 will be needed to impart virtual image focus at a predetermined non-infinite focal depth (as indicated by reference numeral 1115).

Figure 12A:
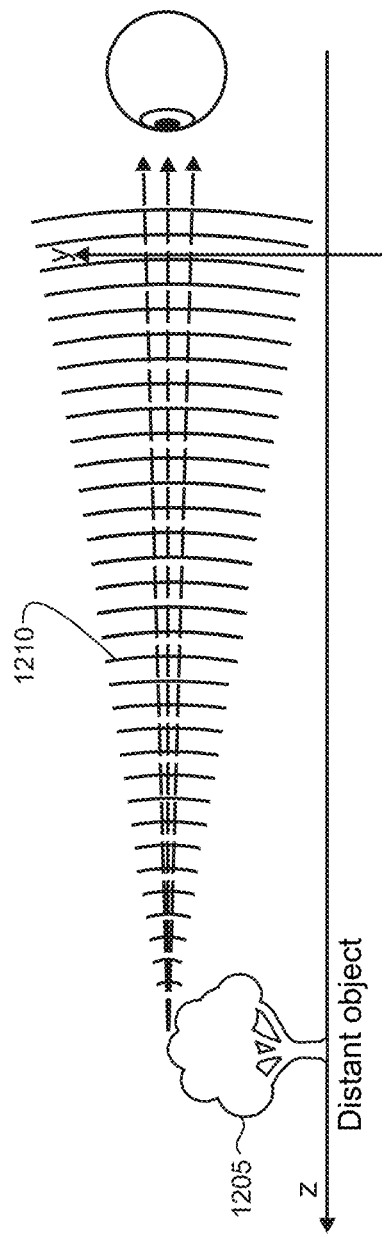
FIGS. 12A, 12B, and 12C show illustrative wavefronts that are respectively associated with a distant object, an object at infinity, and a nearby object.
Figure 12B:
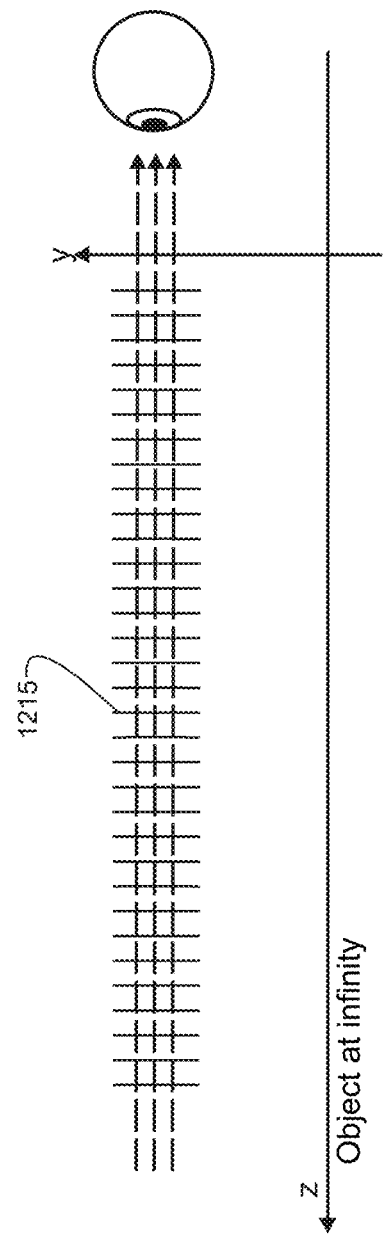
Figure 12C:
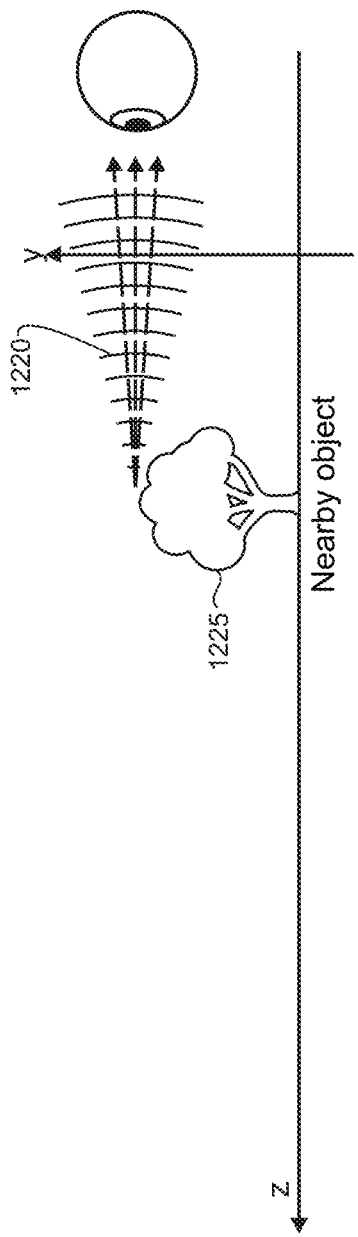

The out-coupling DOE 1105 is adapted to incorporate the negative lens in view of the observation that the wave nature of light provides for spherical wavefronts. As shown in FIG. 12A, a distant object 1205 will have wavefronts 1210 that each have a particular radius of curvature. When an object is located at infinity, as shown in FIG. 12B, each of the spherical wavefronts 1215 has an infinite radius of curvature. The radius of curvature of each spherical wavefront 1220 decreases for a nearby object 1225 as shown in FIG. 12C. Therefore, manipulation of the configuration of the gratings in the out-coupling DOE to thereby impact a spherical shape to the wavefronts of the diffracted fields may be expected to provide a sufficient negative optical power to the DOE to eliminate the requirement for external lenses.

Figure 13:
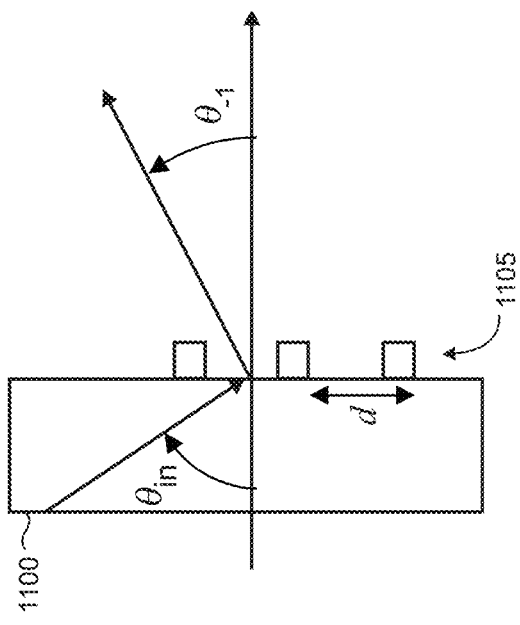
FIG. 13 shows an illustrative unmodified out-coupling DOE without local modulation of grating features.

A simplified grating equation for the first negative (i.e., −1) diffractive order is $$\sin\theta_{-1} = n\sin\theta_{in} - \frac{\lambda}{d}$$

where d is the grating period (i.e., distance between successive features, e.g., gratings, grooves/lines) for the out-coupling DOE 1105, as shown in FIG. 13. Equation (1)

demonstrates that the angle of diffraction can be tuned by locally changing the grating period (along with the orientation when working in three dimensions).

Figure 14:
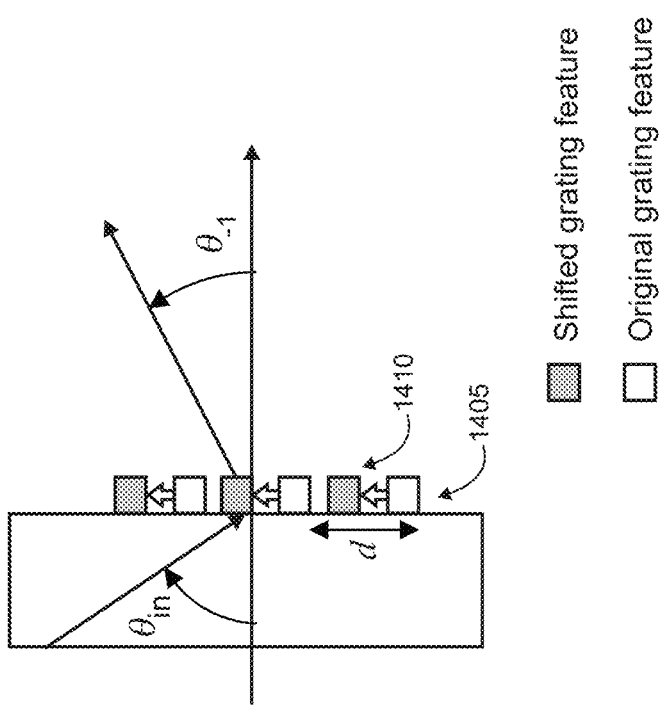
FIG. 14 shows an illustrative out-coupling DOE that is modified with local modulation of grating features to output non-collimated diverging optical beams and provide virtual image focus.

As shown in FIG. 14, a shift in grating features of the out-coupling DOE 1105 from an original location 1405 to a shifted location 1410 will result in a change of phase of a diffracted field in accordance with the detour phase principle introduced by Brown and Lohmann to simulate wavefront propagation in computer-generated holograms using Fourier transformations. Under this principle, the modulation of local position of grating features in the out-coupling DOE will change the phase front of the diffracted field from planar to spherical.

Figure 15:
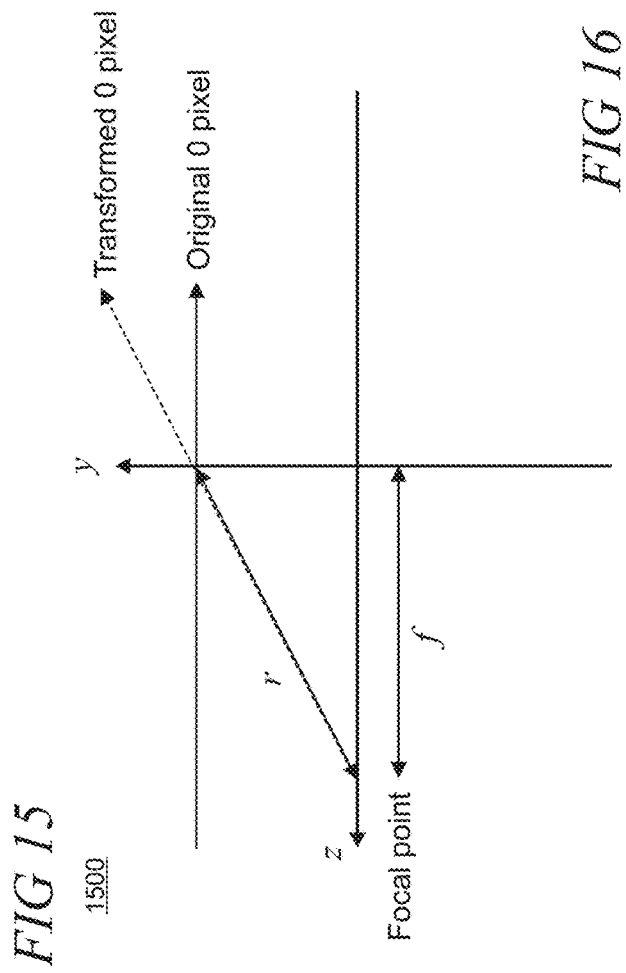
FIG. 15 is an illustrative diagram pertaining to calculations to transform a central holographic image pixel.

FIG. 15 is an illustrative diagram 1500 pertaining to calculations to transform a central holographic image pixel. With reference to the drawing, consider diffraction of the center pixel at position x, y, z=0, we wish to change the local period such that the light diffracts into the direction of the unit vector:

$$s = s_x x + s_y y + s_z z$$

where $s_x = \frac{x}{r}$, $s_y = \frac{y}{r}$, and $s_z = -\frac{f}{r}$, and $r = \sqrt{x^2 + y^2 + f^2}$.

The wave vector thus takes the form $$k_0 = \frac{2\pi}{\lambda_0}$$

and $\lambda_0$ is the design wavelength. The original pixel propagates in the direction $k_{ox}=0$, $k_{oy}=0$, $k_{oz}=-k_0$. We thus just have to find a local period and orientation that makes the desired change.

Now the incoming 0 pixel inside the waveguide propagates in the direction given by $k_{inx}=D_{ox}$, $k_{iny}=D_{oy}$ where $D_{ox}$ and $D_{oy}$ denote the x and y components of the original grating vector and we have chosen the out-coupled diffractive order to be −1. That is, after the change of the grating we have $$k_x = k_{inx} - D_x = D_{ox} - D_x, \quad \text{Eq. (1)}$$
$$k_y = k_{iny} - D_y = D_{oy} - D_y.$$

Hence $$D_x = D_{ox} - \frac{k_0 x}{r}, \quad D_y = D_{oy} - \frac{k_0 y}{r}.$$

Now the local period and orientation is obtained from:

$$d = \frac{2\pi}{\sqrt{D_x^2 + D_y^2}},$$

$$\phi = \arctan\left(\frac{D_y}{D_x}\right)$$

Figure 16:
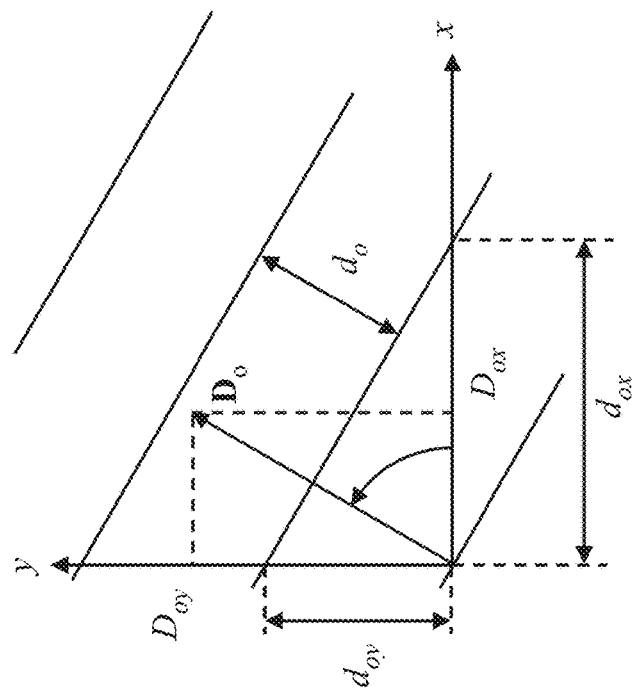
FIG. 16 is an illustrative diagram pertaining to calculations to shift a grating feature.

The shift $\Delta$ of the grating lines causes a phase change $$\Phi = \frac{2\pi\Delta}{d_o}$$

in the −1 diffraction order in which the shift takes place in the direction of the original grating vector. Demanding that the phase equals that of a diverging spherical wave with an origin at the focal point, we have $$D_o = \frac{2\pi}{d_o}$$
$$d_{ox} = d_o \sec\phi_o,$$
$$d_{oy} = d_o \csc\phi_o,$$
$$D_{ox} = D_o \cos\phi_o = 2\pi/d_{ox},$$
$$D_{oy} = D_o \sin\phi_o = \frac{2\pi}{d_{oy}}$$

as shown in the illustrative diagram 1600 shown in FIG. 16.

As shown in the illustrative diagram 1700 in FIG. 1700, for the shift $\Delta$ we have $\Delta_x = \Delta\sec\phi_o$ and $\Delta_y = \Delta\csc\phi_o$, that is $$\frac{\Delta}{d_o} = \frac{\Delta}{d_{ox}} = \frac{\Delta}{d_{oy}}$$

where the shift is an integrated/cumulative quantity.

The components of the local period are obtained from:

$$d_x = d_{ox} + d_x \frac{\partial \Delta_x}{\partial x}, \quad d_y = d_{oy} + d_y \frac{\partial \Delta_y}{\partial y}$$

which gives at once $$D_x = D_{ox}\left(1 - \frac{\partial \Delta_x}{\partial x}\right), \quad D_y = D_{oy}\left(1 - \frac{\partial \Delta_y}{\partial y}\right).$$

Partial differentiations are straightforward since $$\frac{\partial r}{\partial x} = \frac{x}{r} \text{ and } \frac{\partial r}{\partial y} = \frac{y}{r}$$

For example, we have $$\frac{\partial \Delta_x}{\partial x} = \frac{k_0}{D_{ox}} \frac{\partial r}{\partial x} = \frac{k_0 x}{D_{ox} r}$$

and thus obtain $$D_x = D_{ox} - \frac{k_0 x}{r}, \quad D_y = D_{oy} - \frac{k_0 y}{r}$$

which is exactly the same expression in Equation (1) above that was derived using only the propagation direction of the out-coupled diffraction order.

Figure 18:
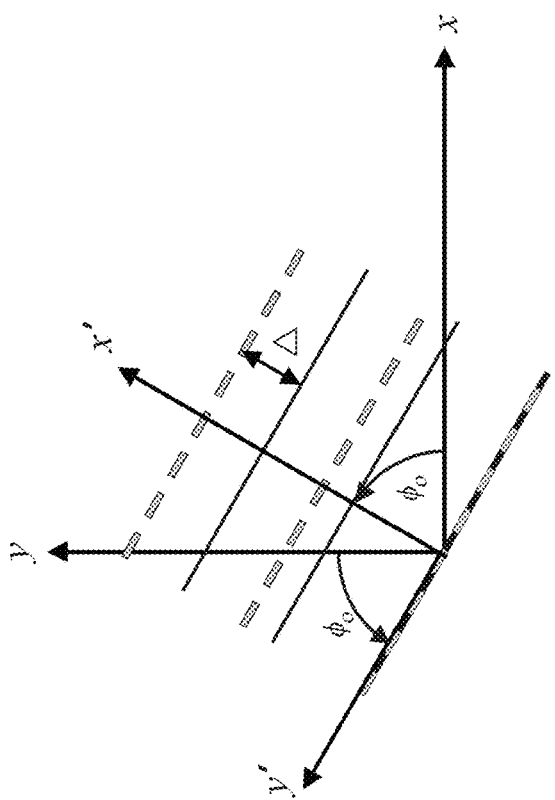
FIGS. 17 and 18 are illustrative diagrams pertaining to calculations to shift a grating feature at any given location on an out-coupling DOE.
Figure 17:
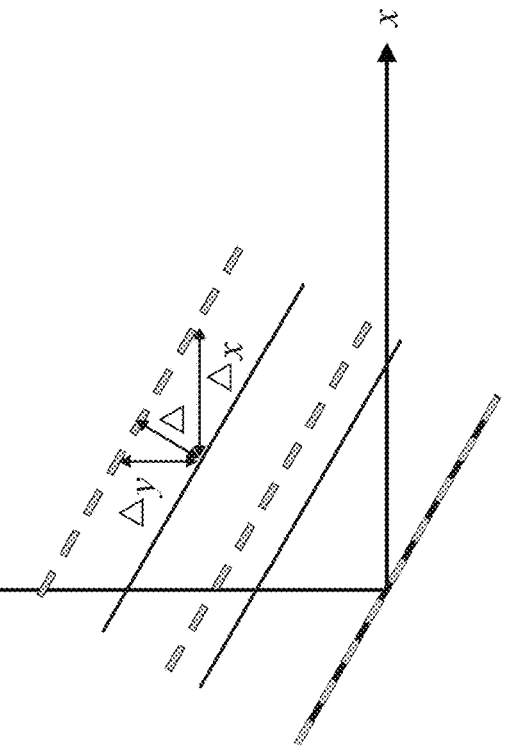

It is noted that $\Delta$ is the realized shift at any given location (x, y). If we want to know how much a particular grating line must be shifted, we must solve for it. Let us denote $\Delta'$ as the unknown shift. Working in the coordinates denoted by primes (as shown in diagram 1800 in FIG. 18) we have $$\Delta(x'+\Delta', y') = \frac{d_o k_o \left[\sqrt{(x'+\Delta')^2 + y'^2 + f^2} - f\right]}{(2\pi)}$$

This expression must equal Δ' (x', y') which leads to a quadratic equation $$\Delta'^2 \left(\frac{\lambda_0^2}{d_0^2} - 1\right) + \Delta'\left(\frac{2f\lambda_0}{d_0} - 2x'\right) - x' - y' = 0.$$

This equation can be readily solved from $$\Delta' = \frac{-b \pm \sqrt{b^2 - 4ac}}{2a} \text{ where}$$

$$a = \frac{\lambda_0^2}{d_0^2} - 1, b = \frac{2f\lambda_0}{d_0} - 2x' = \frac{2f\lambda_0}{d_0} - 2x\cos\phi - 2y\sin\phi, \text{ and}$$

$$c = -x'^2 - y'^2 = -x^2 - y^2.$$

FIG. 19 is an enlarged plan view of an illustrative out-coupling DOE 1900 that shows the period of every 2000$^{th}$ grating feature being modulated to provide for virtual image focus at 2 m. FIG. 20 is an enlarged plan view of an illustrative out-coupling DOE 2000 that shows the period of every 2000$^{th}$ grating feature being modulated to provide for virtual image focus at 0.5 m. The curvature of grating features provides a slow period change across an out-coupling DOE to avoid distortion in the out-coupled holographic images and the real-world images that are seen through the DOE and waveguide. It is emphasized that the virtual focus distances of 2 m and 0.5 m shown in FIGS. 19 and 20 are illustrative and that various different distances for virtual image focus may be utilized as needed to suit particular implementation requirements.

FIG. 21 shows a side view of an illustrative assembly of three waveguides with integrated DOEs that are stacked to form the optical combiner 125 (e.g., as part of the optical system 110 shown in FIG. 1 and described in the accompanying text), in which each waveguide 2105, 2110, and 2115 respectively handles a different color in an RGB (red, green, blue) color model within some input angular range that corresponds to the virtual display FOV of a given HMD device. In typical implementations, the red wavelength range is from 600 nm to 650 nm, the green wavelength range is from 500 nm to 550 nm, and the blue wavelength range is from 430 nm to 480 nm. Other wavelength ranges are also possible. An in-coupling DOE 2120, intermediate DOE 2125, and out-coupling DOE 2130 are representatively shown in FIG. 21.

The stacked waveguides 2105, 2110, and 2115 and their corresponding integrated DOEs may be referred to collectively as a waveguide assembly 2100 which functions as an optical combiner (in the discussion that follows, the terms are considered synonymous unless statements or context indicate otherwise). The color order within the assembly can vary by implementation and other color models may also be used to meet the needs of a particular application. Use of the waveguide assembly enables holographic images to be guided to the eye 115 across a full-color spectrum.

An inter-waveguide space (indicted by reference numeral 2150) is provided such that the distance between adjacent waveguides of the assembly 2100 may be uniformly maintained, for example and not as a limitation, between approximately 50 micrometers (μm) and 300 μm. Structural fittings 2155 may be utilized at one or both of the top and bottom, and/or around portions of the periphery of the assembly to help maintain a suitable alignment of the waveguides. Typically, close spacing tolerances between the waveguides are maintained to provide the optical combiner with performance characteristics including, for example, color uniformity, contrast, and resolution, that meet some desired target. While not specifically shown, spacers, supports, and/or other devices can also be utilized to provide the desired spacing among adjacent waveguides.

In alternative implementations, assemblies with more or fewer waveguides can be utilized, for example, for monochromatic and reduced-color spectrum applications. A single optical substrate may be used to implement a given waveguide in some applications, while other applications can use other counts. Some colors may also be supported using two or more waveguides. For example, an RGBG arrangement may be used in which an extra waveguide provides additional green light which may increase display luminance in some cases.

The waveguides 2105, 2110, and 2115 may be constructed from one of transparent glass or plastic substrates, or combinations thereof, but they are not limited to such materials. For example, in some implementations, thin glass substrates providing high relative refractive indices compared with plastic may provide a suitable balance among design factors including size, weight, FOV, and cost, among others. In other implementations, plastic waveguide substrates may meet design requirements more effectively when cost and weight are sought to be optimized. In typical implementations, the DOEs disposed on the waveguides are fabricated from plastic, for example, as molded surface relief gratings.

As shown, each of the DOEs are disposed on the respective waveguides 2105, 2110, and 2115 in the stack to be internal to the optical combiner 2100. That is, each of the DOEs is at least partially located within an inter-waveguide space 2150. Such construction ensures that none of the DOE grating structures are located on either of the external planar surfaces 2135 and 2140 on respective eye and real-world sides of the optical combiner. The external planar surfaces of the waveguides therefore provide a mechanical function by protecting the DOEs during typical HMD handling and operation while also providing their usual optical function in the combiner. Treatments or processes may be applied to external planar surfaces or the substrates as a whole to further enhance mechanical and/or optical properties of the material in some implementations.

FIG. 22 shows illustrative propagation of holographic image light through the optical combiner 2100. For a given angular range within the virtual FOV, light for each color component 2205, 2210, and 2215 provided by the imager 105 is in-coupled into respective waveguides 2115, 2110, and 2105 using respective individual in-coupling DOEs (representatively indicated by element 2120). The holographic light for each color propagates through the respective intermediate DOEs (not shown in FIG. 22) and the waveguides in TIR and is out-coupled by respective out-coupling DOEs (representatively indicated by element 2130) to the user's eye 115 with an expanded pupil in the horizontal and vertical directions.

The in-coupling DOE 2120 for each waveguide 2105, 2110, and 2115 is configured to in-couple light within angular range described by the FOV and within a particular wavelength range into the waveguide. Light outside the wavelength range passes through the waveguide. For example, the blue holographic image light 2205 is outside the range of wavelength sensitivity for both of the in-coupling DOEs in the red waveguide 2105 and green waveguide 2110. The blue holographic image light therefore passes through the red and green waveguides to reach the in-coupling DOE in the blue waveguide 2115 where it is in-coupled, propagated in TIR within the waveguide, expanded in a horizontal direction in the intermediate DOE (not shown), propagated to the out-coupling DOE where it is expanded in a vertical direction, and out-coupled to the user's eye 115 with an expanded exit pupil relative to the input.

Figure 23:
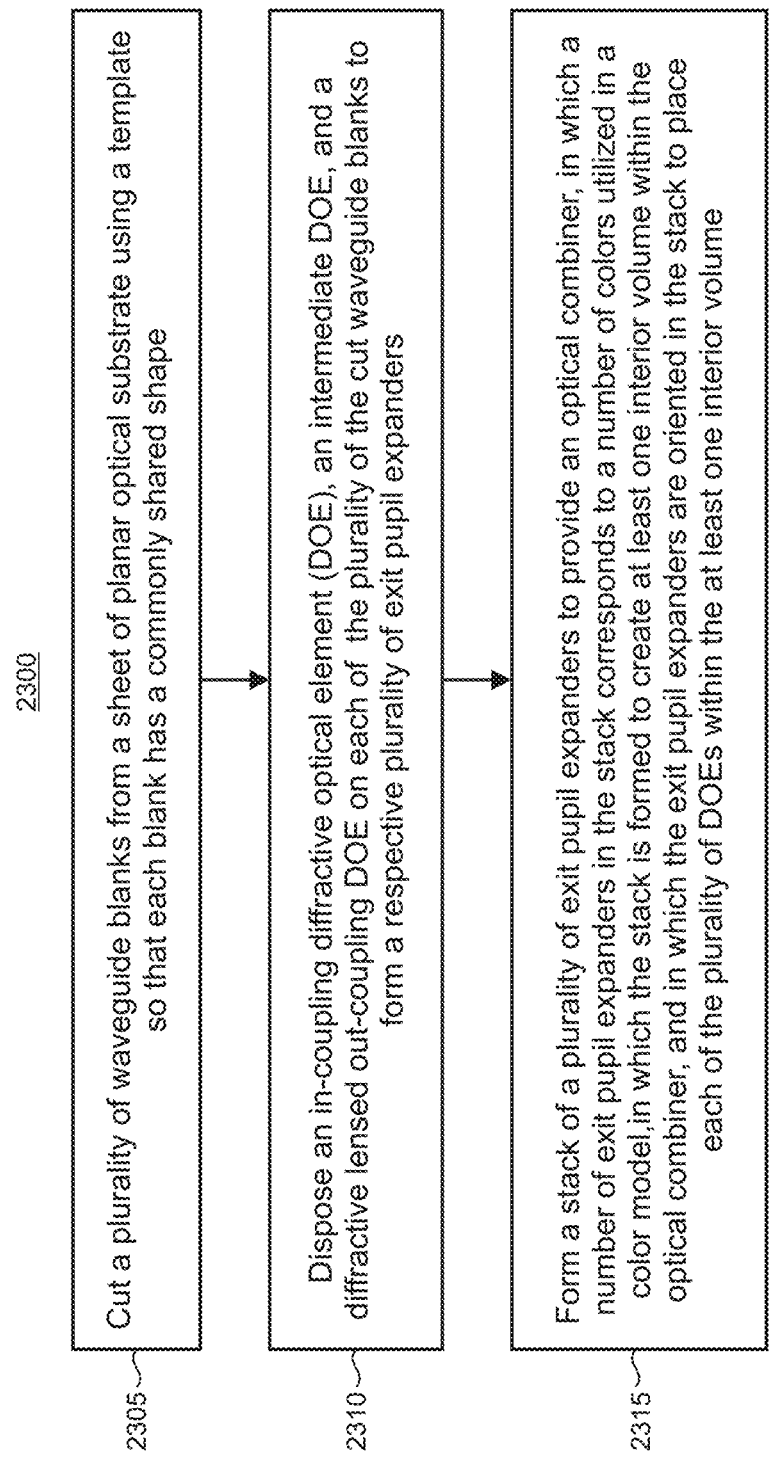
FIG. 23 is a flowchart of an illustrative method for providing a waveguide assembly with virtual image focus.

FIG. 23 is a flowchart 2300 of an illustrative method for providing a waveguide assembly with virtual image focus. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2305 a plurality of waveguide blanks is cut from a sheet of planar optical substrate using a template so that each waveguide blank has a commonly shared shape. In step 2310, an in-coupling DOE, an intermediate DOE, and a diffractive lensed out-coupling DOE are disposed on each of the plurality of the cut waveguide blanks to form a respective plurality of exit pupil expanders. The in-coupling DOE is configured to in-couple one or more optical beams corresponding to holographic images as an input to a respective exit pupil expander. The intermediate DOE is configured for pupil expansion of the one or more optical beams in a first direction. The diffractive lensed out-coupling DOE is configured for pupil expansion of the one or more optical beams in a second direction and is further configured to out-couple the one or more optical beams with a predetermined focal depth as an output from the exit pupil expander with expanded pupil relative to the input. The in-coupling DOE, intermediate DOE, and out-coupling DOE are each disposed on a common side (i.e., the same side) of the waveguide blank.

In step 2315, a stack of a plurality of exit pupil expanders is used to provide an optical combiner, in which a number of exit pupil expanders in the stack corresponds to a number of colors utilized in the color model, the optical combiner having an eye side and a real-world side, in which the stack is formed to create at least one interior volume within the optical combiner and in which the exit pupil expanders are oriented in the stack to place each of the plurality of DOEs within the at least one interior volume. As noted above, by placing the DOEs inside the optical combiner, they are protected during handling and use of the HMD device in which the optical combiner is incorporated.

Figure 24:
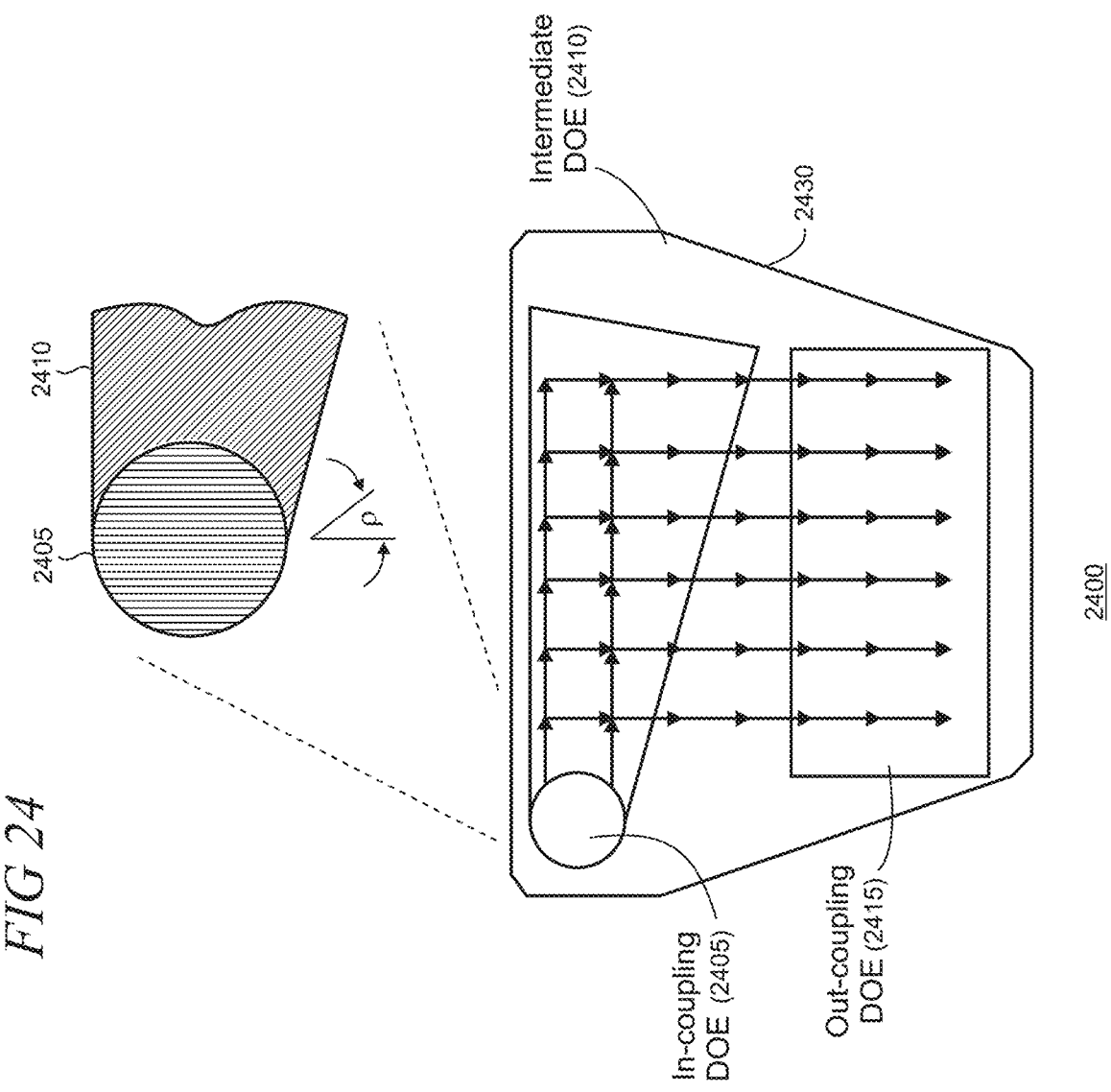
FIG. 24 shows an illustrative arrangement of diffractive optical elements (DOEs) configured for in-coupling, exit pupil expansion in two directions, and out-coupling.

FIG. 24 shows an illustrative waveguide display 2400 having multiple DOEs that may be used with, or incorporated as a part of, a see-through waveguide 2430 to provide in-coupling, expansion of the exit pupil in two directions, and out-coupling. The waveguide display 2400 may be utilized in an exit pupil expander that is included in the near-eye display system 100 (FIG. 1) to provide holographic images to one of the user's eyes. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating.

The waveguide display 2400 includes an in-coupling DOE 2405, an out-coupling DOE 2415, and an intermediate DOE 2410 that couples light between the in-coupling and out-coupling DOEs. The in-coupling DOE is configured to couple image light comprising one or more imaging beams from an imager 105 (FIG. 1) into the waveguide. The intermediate DOE expands the exit pupil in a first direction along a first coordinate axis (e.g., horizontal), and the out-coupling DOE expands the exit pupil in a second direction along a second coordinate axis (e.g., vertical) and couples light out of the waveguide to the user's eye (i.e., outwards from the plane of the drawing page). The angle ρ is a rotation angle between the periodic lines of the in-coupling DOE and the intermediate DOE as shown. As the light propagates in the intermediate DOE (horizontally from left to right in the drawing), it is also diffracted (in the downward direction) to the out-coupling DOE.

While DOEs are shown in this illustrative example using a single in-coupling DOE disposed to the left of the intermediate DOE 2410, which is located above the out-coupling DOE, in some implementations, the in-coupling DOE may be centrally positioned within the waveguide and one or more intermediate DOEs can be disposed laterally from the in-coupling DOE to enable light to propagate to the left and right while providing for exit pupil expansion along the first direction. It may be appreciated that other numbers and arrangements of DOEs may be utilized to meet the needs of a particular implementation.

Figure 25:
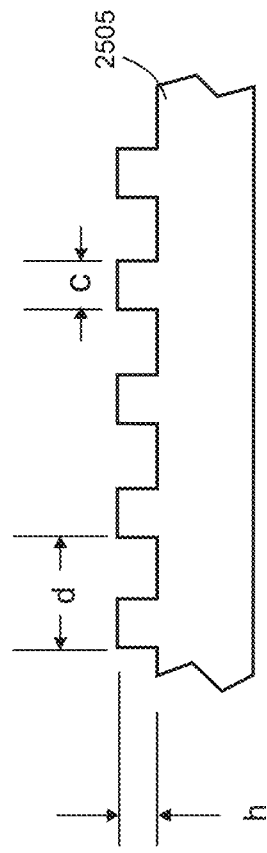
FIG. 25 shows a profile of a portion of an illustrative diffraction grating that has straight gratings.
Figure 26:
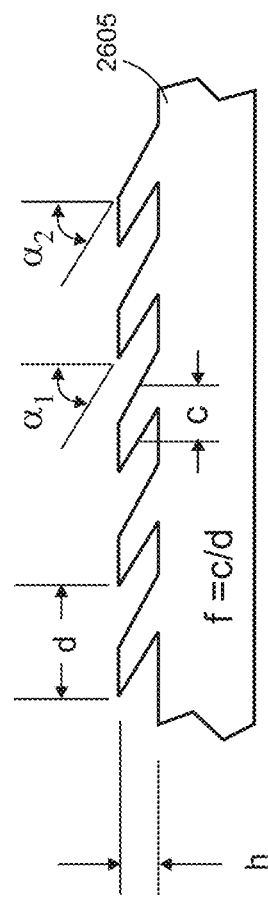
FIG. 26 shows a profile of a portion of an illustrative diffraction grating that has asymmetric or slanted gratings.

The grating features used in the DOEs in the waveguide display 2400 may take various suitable forms. For example, FIG. 25 shows a profile of straight (i.e., non-slanted) grating features 2500 (referred to as grating bars, grating lines, or simply "gratings"), that are formed in a substrate 2505. By comparison, FIG. 26 shows grating features 2600 formed in a substrate 2605 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles. In FIGS. 25 and 26, the grating period is represented by d, the grating height by h, bar width by c, and the filling factor by f, where f=c/d. The slanted gratings in FIG. 26 may be described by slant angles $\alpha_1$ and $\alpha_2$.

Figure 28:
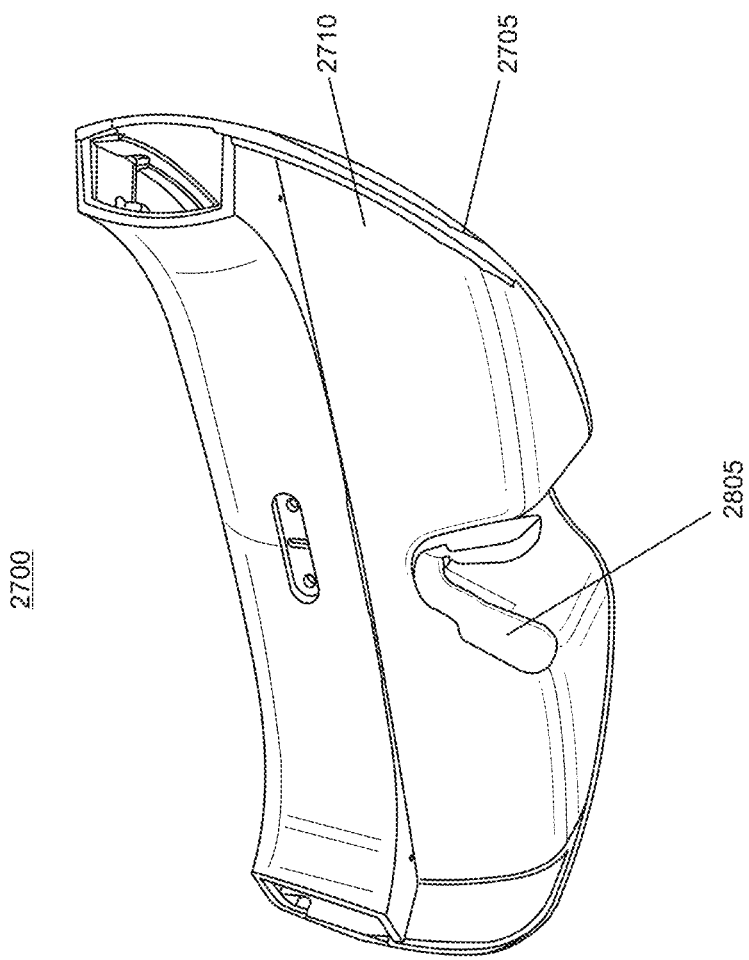
FIG. 28 shows a pictorial rear view of an illustrative sealed visor.

FIGS. 27 and 28 show respective front and rear views of an illustrative example of a visor 2700 that incorporates an internal near-eye display system that is used in a head-mounted display (HMD) device 705 worn by a user 710. The near-eye display system may be configured with a waveguide assembly with virtual image focus using the optical combiner 2100 (FIG. 21) described above. The visor 2700, in some implementations, may be sealed to protect the internal near-eye display system. The visor 2700 typically interfaces with other components of the HMD device 705 such as head-mounting/retention systems and other subsystems including sensors, power management, controllers, etc., as illustratively described in conjunction with FIGS. 30 and 31. Suitable interface elements (not shown) including snaps, bosses, screws and other fasteners, etc. may also be incorporated into the visor 2700.

Figure 29:
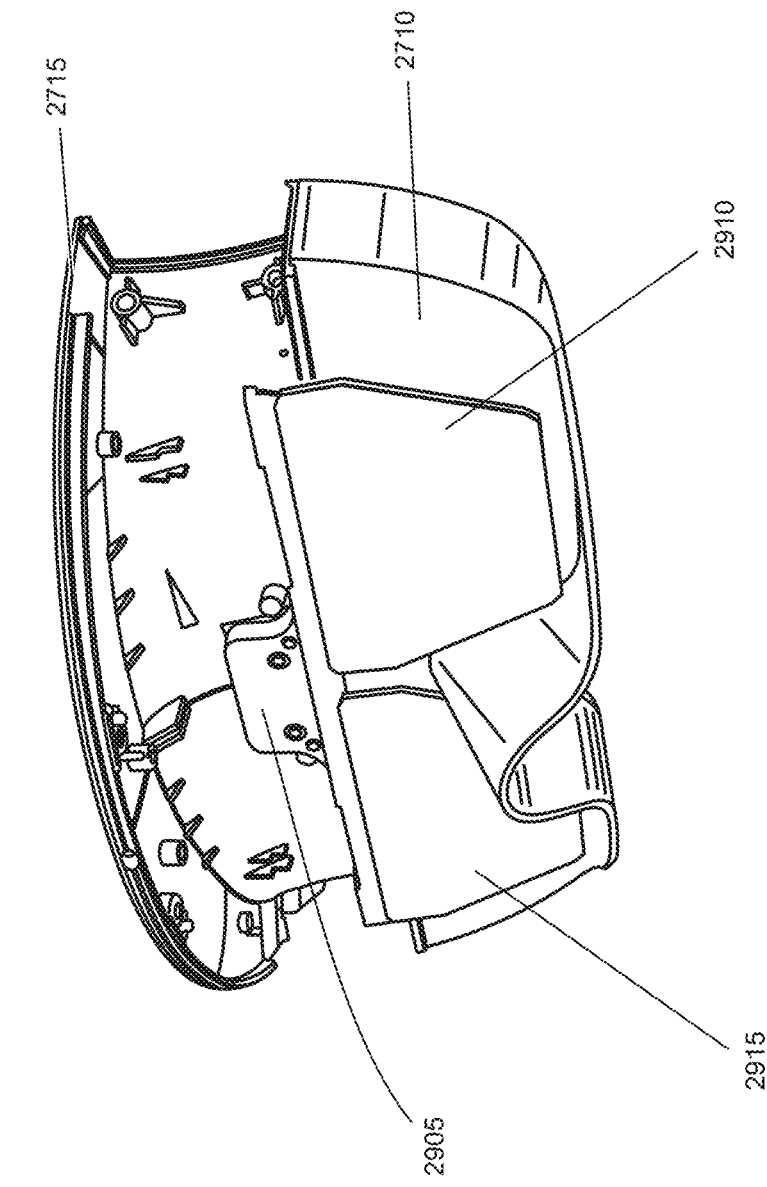
FIG. 29 shows a partially disassembled view of an illustrative sealed visor.

The visor 2700 may include see-through front and rear shields, 2705 and 2710 respectively, that can be molded using transparent materials to facilitate unobstructed vision to the optical displays and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 2705 shown in the disassembled view in FIG. 29.

The sealed visor 2700 can physically protect sensitive internal components, including a near-eye display system 2905 (shown in FIG. 29), when the HMD device is operated and during normal handling for cleaning and the like. The near-eye display system 2905 includes left and right waveguide displays 2910 and 2915 that respectively provide holographic images to the user's left and right eyes for mixed- and/or virtual-reality applications. The visor can also protect the near-eye display system from environmental elements and damage should the HMD device be dropped or bumped, impacted, etc.

In some implementations, the visor can provide a measure of redundant protection to the DOEs that are internally located within the optical combiner 2100 (FIG. 21), as described above when used in the near-eye display system 2905. In other implementations, the visor can be reduced in size and weight such that the protection provided to the DOEs is shared between the visor and the external major surfaces of the optical combiner.

As shown in FIG. 28, the rear shield 2710 is configured in an ergonomically suitable form 2805 to interface with the user's nose, and nose pads and/or other comfort features can be included (e.g., molded-in and/or added-on as discrete components) In some applications, the sealed visor 2700 can also incorporate some level of optical diopter curvature (i.e., eye prescription) within the molded shields in some cases. The sealed visor 2700 can also be configured to incorporate the lenses 1005 and 1020 (FIG. 10) on either side of the near-eye display system 2905 when such lenses are utilized. However, as described above in the description accompanying FIG. 21, such lenses can be advantageously eliminated from the HMD device when using the optical combiner having internally disposed out-coupling DOEs with integrated negative lens power.

Figure 30:
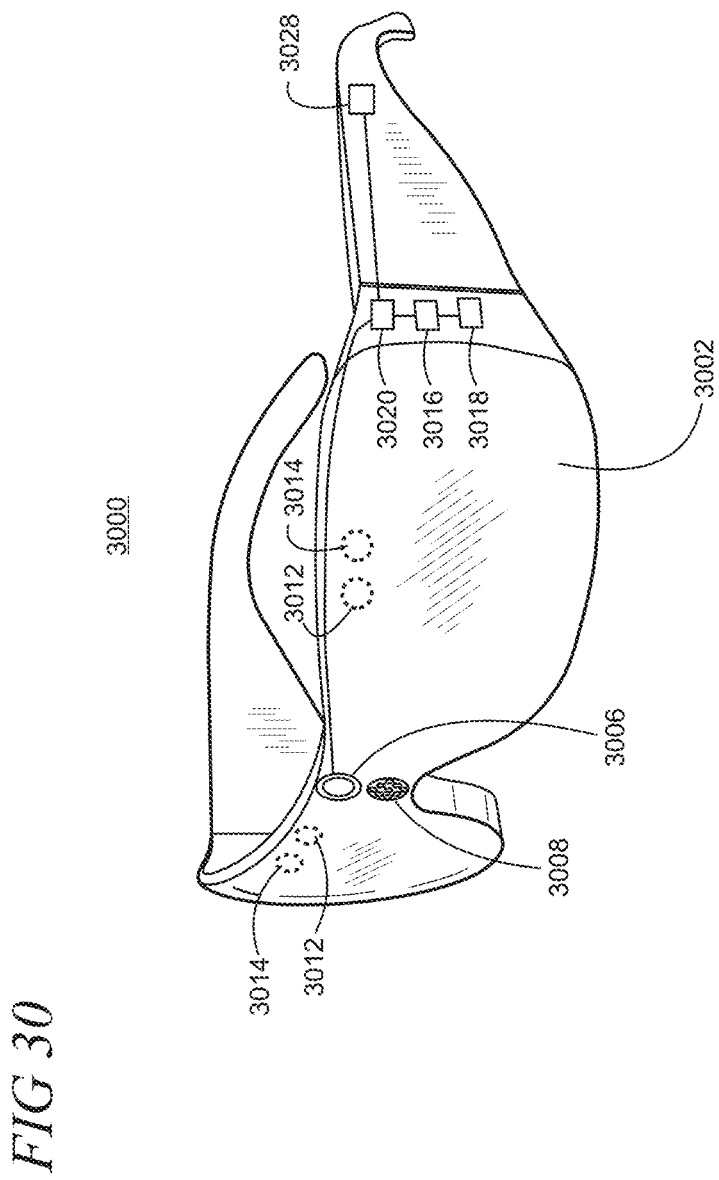
FIG. 30 is a pictorial view of an illustrative example of a virtual-reality or mixed-reality HMD device that may use the present waveguide assembly with virtual image focus.
Figure 31:
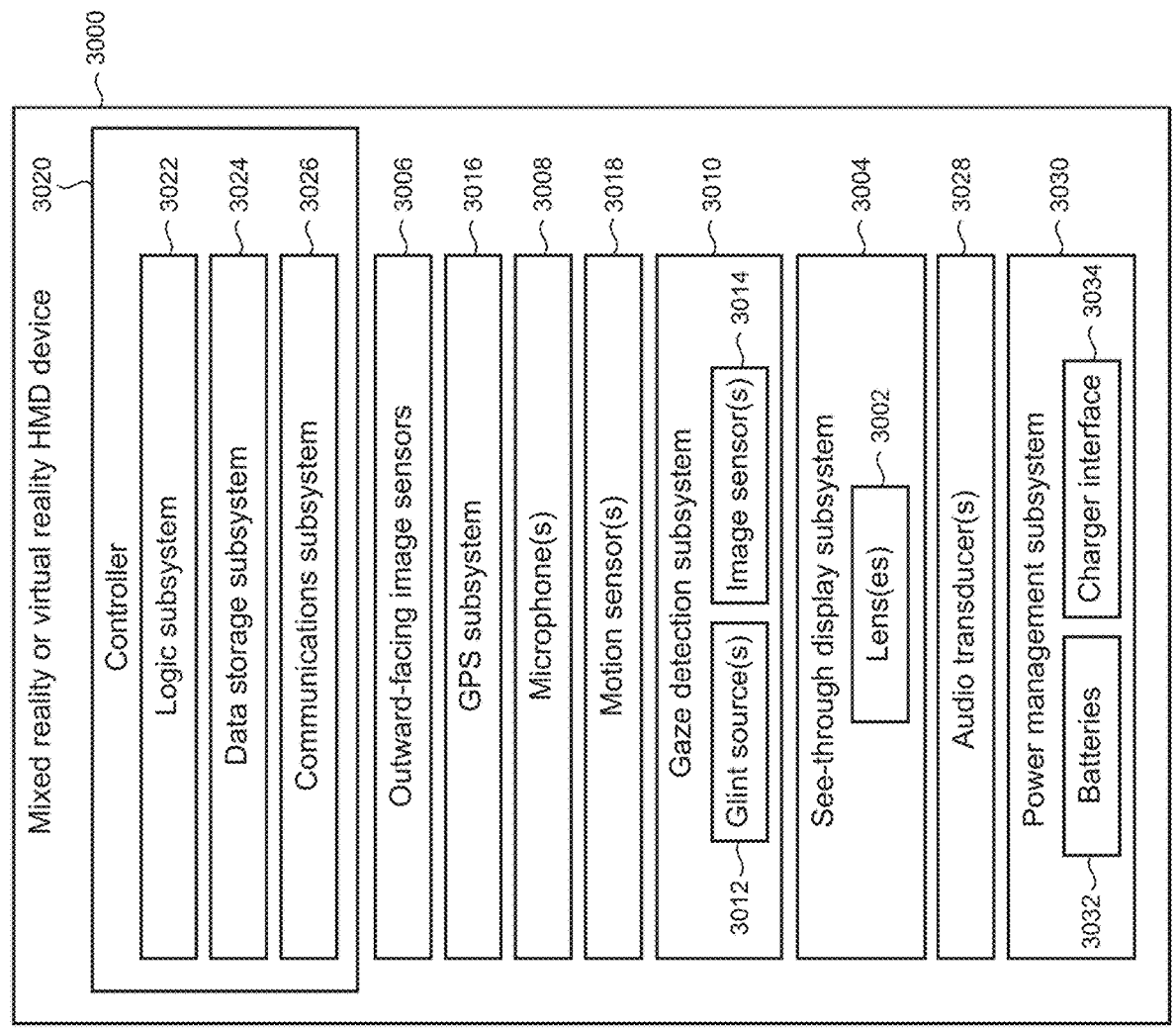
FIG. 31 shows a block diagram of an illustrative example of a virtual-reality or mixed-reality HMD device that may use the present waveguide assembly with virtual image focus.

The present waveguide assembly with virtual image focus may be utilized in mixed- or virtual-reality applications. FIG. 30 shows one particular illustrative example of a mixed-reality HMD device 3000, and FIG. 31 shows a functional block diagram of the device 3000. The HMD device 3000 provides an alternative form factor to the HMD device 705 shown in FIGS. 7 and 27. HMD device 3000 comprises one or more lenses 3002 that form a part of a see-through display subsystem 3004, so that images may be displayed using lenses 3002 (e.g. using projection onto lenses 3002, one or more waveguide systems, such as a near-eye display system, incorporated into the lenses 3002, and/or in any other suitable manner).

HMD device 3000 further comprises one or more outward-facing image sensors 3006 configured to acquire images of a background scene and/or physical environment being viewed by a user and may include one or more microphones 3008 configured to detect sounds, such as voice commands from a user. Outward-facing image sensors 3006 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 3000 may further include a gaze detection subsystem 3010 configured for detecting a direction of gaze of each eye of a user or a direction or location of focus, as described above. Gaze detection subsystem 3010 may be configured to determine gaze directions of each of a user's eyes in any suitable manner. For example, in the illustrative example shown, a gaze detection subsystem 3010 includes one or more glint sources 3012, such as infrared light sources, that are configured to cause a glint of light to reflect from each eyeball of a user, and one or more image sensors 3014, such as inward-facing sensors, that are configured to capture an image of each eyeball of the user. Changes in the glints from the user's eyeballs and/or a location of a user's pupil, as determined from image data gathered using the image sensor(s) 3014, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 3010 may have any suitable number and arrangement of light sources and image sensors. In some implementations, the gaze detection subsystem 3010 may be omitted.

The HMD device 3000 may also include additional sensors. For example, HMD device 3000 may comprise a global positioning system (GPS) subsystem 3016 to allow a location of the HMD device 3000 to be determined. This may help to identify real-world objects, such as buildings, etc. that may be located in the user's adjoining physical environment.

The HMD device 3000 may further include one or more motion sensors 3018 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 3006. The use of motion data may allow changes in gaze direction to be tracked even if image data from outward-facing image sensor(s) 3006 cannot be resolved.

In addition, motion sensors 3018, as well as microphone(s) 3008 and gaze detection subsystem 3010, also may be employed as user input devices, such that a user may interact with the HMD device 3000 via gestures of the eye, neck and/or head, as well as via verbal commands in some cases. It may be understood that sensors illustrated in FIGS. 30 and 31 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 3000 can further include a controller 3020 such as one or more processors having a logic subsystem 3022 and a data storage subsystem 3024 in communication with the sensors, gaze detection subsystem 3010, display subsystem 3004, and/or other components through a communications subsystem 3026. The communications subsystem 3026 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 3024 may include instructions stored thereon that are executable by logic subsystem 3022, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 3000 is configured with one or more audio transducers 3028 (e.g., speakers, earphones, etc.) so that audio can be utilized as part of a mixed-reality or virtual-reality experience. A power management subsystem 3030 may include one or more batteries 3032 and/or protection circuit modules (PCMs) and an associated charger interface 3034 and/or remote power interface for supplying power to components in the HMD device 3000.

It may be appreciated that the HMD device 3000 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 32:
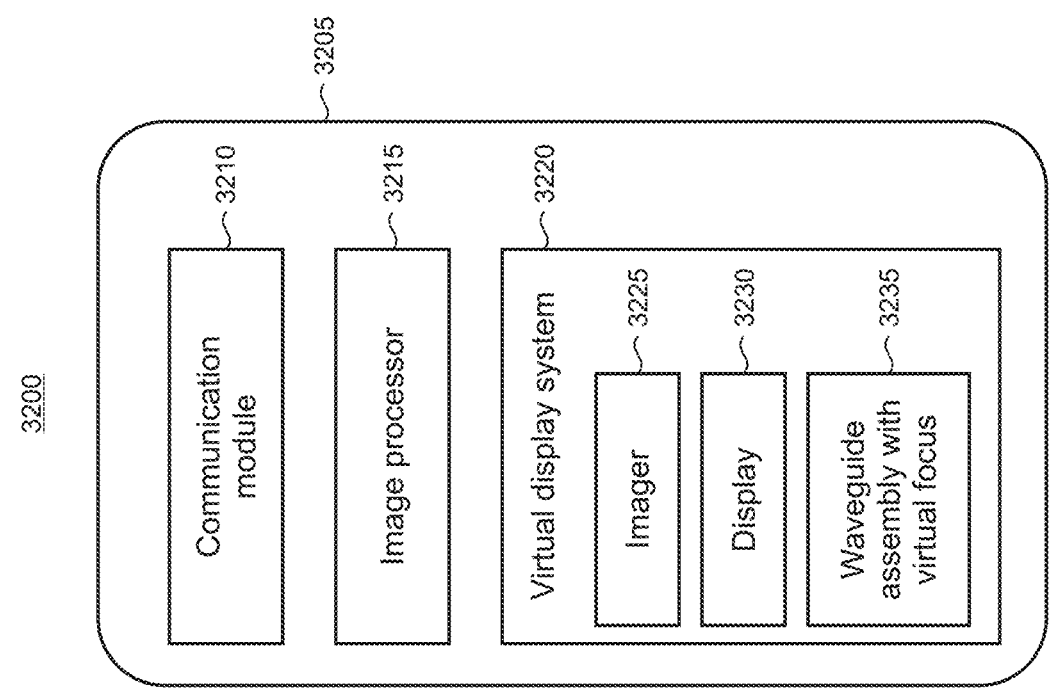
FIG. 32 shows a block diagram of an illustrative electronic device that incorporates a mixed-reality display system that may use the present waveguide assembly with virtual image focus.

As shown in FIG. 32, a waveguide assembly with virtual focus can be used in a mobile or portable electronic device 3200, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 3200 includes a housing 3205 to house a communication module 3210 for receiving and transmitting information from and to an external device, or a remote system or service (not shown).

The portable device 3200 may also include an image processor 3215 using one or more processors for handling the received and transmitted information, and a virtual display system 3220 to support viewing of images. The virtual display system 3220 can include a micro-display or an imager 3225 configured to provide holographic images on a display 3230. The image processor 3215 may be operatively connected to the imager 3225 and may obtain real-world image data, such as video data from a camera in the device (not shown), so that virtual- and/or mixed-reality images may be rendered on the display 3230. In implementations in which one or more DOEs are utilized to support the display, a waveguide assembly with virtual image focus 3235 may be implemented in accordance with the inventive principles of operation discussed herein.

The waveguide assembly with virtual image focus may also be utilized in non-portable devices that are configured for virtual- and/or mixed-reality applications having a display, such as gaming devices, multimedia consoles, personal computers, vending machines, smart appliances, Internet-connected devices, and home appliances, such as an oven, microwave oven and other appliances, and other non-portable devices.

Various exemplary embodiments of the present waveguide assembly with virtual image focus are now presented by way of illustration and not as an exhaustive list of all embodiments. An example includes a near-eye mixed-reality optical system, comprising: a see-through planar optical waveguide through which real-world images are viewable by a user of the mixed-reality optical system, the optical waveguide including a first planar side and a second planar side opposite the first planar side; a first diffractive optical element (DOE) disposed on a surface of the first planar side of the optical waveguide, the first DOE having an input region and configured as an in-coupling grating to in-couple, at the input region, one or more optical beams associated with holographic images from a holographic image source; a second DOE disposed on a surface of the first planar side of the optical waveguide and configured for pupil expansion of the one or more optical beams along a first direction; and a third DOE disposed on a surface of the first planar side of the optical waveguide, the third DOE having an output region and configured for pupil expansion of the one or more optical beams along a second direction, and further configured as an out-coupling grating to out-couple, as a display to an eye of the user, the one or more optical beams with expanded pupil relative to the input; wherein the third DOE provides negative optical power using a plurality of grating features that are locally modulated over an extent of the third DOE to impart a spherical wavefront to the out-coupled one or more optical beams.

In another example, the spherical wavefront has a curvature that provides virtual image focus for the displayed holographic images at a distance less than infinity. In another example, the virtual image focus comprises a predetermined depth relative to the user. In another example, the one or more optical beams comprise one of a red wavelength range, blue wavelength range, or green wavelength range. In another example, the near-eye mixed-reality optical system further comprises a second see-through planar optical waveguide and a third see-through planar optical waveguide, the see-through planar optical waveguides being configured in a stack to form an optical combiner wherein each see-through planar optical waveguide propagates one or more optical beams for the holographic images for a different color in an RGB (red, green, blue) color model, the optical combiner having an eye side and a real-world side, wherein the second planar side of the second see-through planar optical waveguide forms the eye side of the combiner and the second planar side of the third see-through planar optical waveguide forms the real-world side of the optical combiner. In another example, a uniform gap is maintained between adjacent see-through planar optical waveguides in the stack using one of spacer or structural fitting that is disposed along one or more peripheral edge of the optical combiner. In another example, one or more of the see-through planar optical waveguides comprises a glass material.

A further example includes a head-mounted display (HMD) device wearable by a user and supporting a mixed-reality experience including full color holographic images from a virtual world that are represented with a color model and real-world images for objects in a real world, comprising: an imager generating one or more optical beams for the holographic images for each individual color in the color model; an optical combiner receiving the one or more optical beams from the imager as an input and having a plurality of waveguides including a waveguide for each individual color, in which the waveguides optically align in a planar stack to combine the individual colors into the full color holographic images when output from the optical combiner, wherein the stack of waveguides includes inter-waveguide spaces between adjacent waveguides in the stack that are interior to the optical combiner; an exit pupil expander disposed on each of the waveguides for each individual color, the exit pupil expander comprising a plurality of diffractive optical elements (DOEs), in which the exit pupil expander is configured to provide one or more out-coupled optical beams as the output from the optical combiner having an expanded exit pupil relative to the input, and in which the DOEs are located within the inter-waveguide spaces.

In another example, the plurality of DOEs in the exit pupil expander includes an out-coupling DOE disposed on each of the waveguides, the out-coupling DOE comprising curved grating features to provide the out-coupling DOE with negative optical power. In another example, the out-coupling DOE provides focus for the holographic images in a plane at a predetermined depth from the HMD device. In another example, the out-coupling DOE provides negative optical power to only the holographic images that are output from the optical combiner. In another example, the exit pupil expander provides exit pupil expansion in two directions. In another example, the imager includes one of light emitting diode, liquid crystal on silicon display, organic light emitting diode array, or micro-electro mechanical system device. In another example, each of the waveguides and DOEs are configured as see-through. In another example, the optical combiner includes three waveguides wherein a separate waveguide is utilized for each color in a red, green, blue (RGB) color model. In another example, the plurality of DOEs comprises an in-coupling DOE configured for in-coupling the input optical beams to the optical combiner, an intermediate DOE configured for expanding the exit pupil in a first direction, and an out-coupling DOE configured for expanding the exit pupil in a second direction.

A further example includes a method for assembling an optical combiner that is associated with a color model and utilized in a mixed-reality environment in which holographic images are mixed with real-world images, comprising: cutting a plurality of waveguide blanks from a sheet of planar optical substrate using a template so that each waveguide blank has a commonly shared shape; disposing an in-coupling diffractive optical element (DOE), an intermediate DOE, and a diffractive lensed out-coupling DOE on each of the plurality of the cut waveguide blanks to form a respective plurality of exit pupil expanders, the in-coupling DOE configured to in-couple one or more optical beams corresponding to holographic images as an input to a respective exit pupil expander, the intermediate DOE configured for pupil expansion of the one or more optical beams in a first direction, and the diffractive lensed out-coupling DOE configured for pupil expansion of the one or more optical beams in a second direction and further configured to out-couple the one or more optical beams with a predetermined focal depth as an output from the exit pupil expander with expanded pupil relative to the input, in which the in-coupling DOE, intermediate DOE, and out-coupling DOE are disposed on a common side of the waveguide blank; and forming a stack of a plurality of exit pupil expanders to provide an optical combiner, in which a number of exit pupil expanders in the stack corresponds to a number of colors utilized in the color model, in which the stack is formed to create at least one interior volume within the optical combiner, and in which the exit pupil expanders are oriented in the stack to place each of the plurality of DOEs within the at least one interior volume.

In another example, the planar optical substrate comprises glass and the DOEs are fabricated from plastic. In another example, the method further includes forming the stack to maintain an even gap between successive exit pupil expanders. In another example, the even gap between successive exit pupil expanders in the stack is in range between 50 μm and 300 μm.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A near-eye mixed-reality optical system, comprising:
   a see-through planar optical waveguide through which real-world images are viewable by a user of the mixed-reality optical system, the optical waveguide including a first planar side and a second planar side opposite the first planar side;
   a first diffractive optical element (DOE) disposed on a surface of the first planar side of the optical waveguide, the first DOE having an input region and configured as an in-coupling grating to in-couple, at the input region, one or more optical beams associated with holographic images from a holographic image source;
   a second DOE disposed on a surface of the first planar side of the optical waveguide and configured for pupil expansion of the one or more optical beams along a first direction; and
   a third DOE disposed on a surface of the first planar side of the optical waveguide, the third DOE having an output region and configured for pupil expansion of the one or more optical beams along a second direction, and further configured as an out-coupling grating to out-couple, as a display to an eye of the user, the one or more optical beams with expanded pupil relative to the input;
   wherein the third DOE provides negative optical power using a plurality of grating features that are locally modulated to shift the grating features over an extent of the third DOE to cause a phase change in a −1 diffraction order to impart a spherical wavefront to the out-coupled one or more optical beams.

2. The near-eye mixed-reality optical system of claim 1 in which the spherical wavefront has a curvature that provides virtual image focus for the displayed holographic images at a distance less than infinity.

3. The near-eye mixed-reality optical system of claim 2 in which the virtual image focus comprises a predetermined depth relative to the user.

4. The near-eye mixed-reality optical system of claim 1 in which the one or more optical beams comprise one of a red wavelength range, blue wavelength range, or green wavelength range.

5. The near-eye mixed-reality optical system of claim 1 further comprising a second see-through planar optical waveguide and a third see-through planar optical waveguide, the see-through planar optical waveguides being configured in a stack to form an optical combiner wherein each see-through planar optical waveguide propagates one or more optical beams for the holographic images for a different color in an RGB (red, green, blue) color model, the optical combiner having an eye side and a real-world side, wherein the second planar side of the second see-through planar optical waveguide forms the eye side of the combiner and the second planar side of the third see-through planar optical waveguide forms the real-world side of the optical combiner.

6. The near-eye mixed-reality optical system of claim 5 in which a uniform gap is maintained between adjacent see-through planar optical waveguides in the stack using one of spacer or structural fitting that is disposed along one or more peripheral edges of the optical combiner.

7. The near-eye mixed-reality optical system of claim 5 in which one or more of the see-through planar optical waveguides comprise a glass material.

8. A head-mounted display (HMD) device wearable by a user and supporting a mixed-reality experience including full color holographic images from a virtual world that are represented with a color model and real-world images for objects in a real world, comprising:
  an imager generating one or more optical beams for the holographic images for each individual color in the color model;
  an optical combiner receiving the one or more optical beams from the imager as an input and having a plurality of waveguides including a waveguide for each individual color, in which the waveguides optically align in a planar stack to combine the individual colors into the full color holographic images when output from the optical combiner, wherein the stack of waveguides includes inter-waveguide spaces between adjacent waveguides in the stack that are interior to the optical combiner; and
  an exit pupil expander disposed on each of the waveguides for each individual color, the exit pupil expander comprising a plurality of diffractive optical elements (DOEs), in which the exit pupil expander is configured to provide one or more out-coupled optical beams as the output from the optical combiner having an expanded exit pupil relative to the input, and in which the DOEs are located within the inter-waveguide spaces,
  wherein the exit pupil expander includes an out-coupling DOE providing negative optical power using a plurality of grating features that are locally modulated to shift the grating features over an extent of the out-coupling DOE to cause a phase change in a −1 diffraction order to impart a spherical wavefront to the one or more out-coupled optical beams.

9. The HMD device of claim 8 in which the plurality of DOEs in the exit pupil expander includes an out-coupling DOE disposed on each of the waveguides, the out-coupling DOE comprising curved grating features to provide the out-coupling DOE with negative optical power.

10. The HMD device of claim 9 in which the out-coupling DOE provides focus for the holographic images in a plane at a predetermined depth from the HMD device.

11. The HMD device of claim 9 in which the out-coupling DOE provides negative optical power to only the holographic images that are output from the optical combiner.

12. The HMD device of claim 8 in which the exit pupil expander provides exit pupil expansion in two directions.

13. The HMD device of claim 8 in which the imager includes one of light emitting diode, liquid crystal on silicon display, organic light emitting diode array, or micro-electro mechanical system device.

14. The HMD device of claim 8 in which each of the waveguides and DOEs are configured as see-through.

15. The HMD device of claim 8 in which the optical combiner includes three waveguides wherein a separate waveguide is utilized for each color in a red, green, blue (RGB) color model.

16. The HMD device of claim 8 in which the plurality of DOEs comprises an in-coupling DOE configured for in-coupling the input optical beams to the optical combiner, an intermediate DOE configured for expanding the exit pupil in a first direction, and an out-coupling DOE configured for expanding the exit pupil in a second direction.

17. A method for assembling an optical combiner that is associated with a color model and utilized in a mixed-reality environment in which holographic images are mixed with real-world images, comprising:
  cutting a plurality of waveguide blanks from a sheet of planar optical substrate using a template so that each waveguide blank has a commonly shared shape;
  disposing an in-coupling diffractive optical element (DOE), an intermediate DOE, and a diffractive lensed out-coupling DOE on each of the plurality of cut waveguide blanks to form a respective plurality of exit pupil expanders, the in-coupling DOE configured to in-couple one or more optical beams corresponding to holographic images as an input to a respective exit pupil expander, the intermediate DOE configured for pupil expansion of the one or more optical beams in a first direction, and the diffractive lensed out-coupling DOE configured for pupil expansion of the one or more optical beams in a second direction and further configured to out-couple the one or more optical beams with a predetermined focal depth as an output from the exit pupil expander with expanded pupil relative to the input, in which the in-coupling DOE, intermediate DOE, and diffractive lensed out-coupling DOE are disposed on a common side of the waveguide blank, wherein the diffractive lensed out-coupling DOE provides negative optical power using a plurality of grating features that are locally modulated to shift the grating features over an extent of the out-coupling DOE to cause a phase change in a −1 diffraction order to impart a spherical wavefront to the out-coupled one or more optical beams; and
  forming a stack of a plurality of exit pupil expanders to provide an optical combiner, in which a number of exit pupil expanders in the stack corresponds to a number of colors utilized in the color model, in which the stack is formed to create at least one interior volume within the optical combiner, and in which the exit pupil expanders are oriented in the stack to place each of the plurality of DOEs within the at least one interior volume.

18. The method of claim 17 in which the planar optical substrate comprises glass and the DOEs are fabricated from plastic.

19. The method of claim 17 further including forming the stack to maintain an even gap between successive exit pupil expanders.

20. The method of claim 19 in which the even gap between successive exit pupil expanders in the stack is in range between 50 μm and 300 μm.

* * * * *